United States Patent [19]
Yamasaki

[11] Patent Number: 5,317,552
[45] Date of Patent: May 31, 1994

[54] LINEAR ACTUATOR FOR DRIVING AN OPTICAL HEAD INCORPORATED IN AN OPTICAL DISK

[75] Inventor: Hideo Yamasaki, Yokohama, Japan

[73] Assignee: Kabushiki Kaisha Toshiba, Kawasaki, Japan

[21] Appl. No.: 538,098

[22] Filed: Jun. 13, 1990

[30] Foreign Application Priority Data

| Jun. 13, 1989 | [JP] | Japan | 1-148451 |
| Dec. 27, 1989 | [JP] | Japan | 1-336660 |
| Feb. 27, 1990 | [JP] | Japan | 2-44404 |

[51] Int. Cl.$^5$ .......................................... G11B 7/09
[52] U.S. Cl. ............................ 369/44.14; 369/44.16; 359/814; 359/824
[58] Field of Search ............... 369/44.16, 44.15, 44.14, 369/44.17, 44.18, 44.19, 44.21, 44.22; 359/813, 814, 823, 824; 310/15, 17, 21, 22, 24

[56] References Cited

U.S. PATENT DOCUMENTS

| 4,545,046 | 10/1985 | Jansen et al. | 369/44.16 |
| 4,613,962 | 9/1986 | Inoue et al. | 369/44.22 |
| 4,958,336 | 9/1990 | Suzuki et al. | 369/44.21 |
| 5,007,712 | 4/1991 | Kikuchi et al. | 369/44.15 |
| 5,073,883 | 12/1991 | Mitsunori | 369/44.15 |

FOREIGN PATENT DOCUMENTS

| 0287235 | 10/1988 | European Pat. Off. | 369/44.14 |
| 56-68261 | 6/1981 | Japan | 310/15 |
| 57-18035 | 1/1982 | Japan | 369/44.14 |
| 58-159249 | 9/1983 | Japan | |
| 61-239432 | 10/1986 | Japan | 369/44.14 |
| 63-2119 | 1/1988 | Japan | 369/44.14 |
| 63-122029 | 5/1988 | Japan | 369/44.15 |
| 63-200321 | 8/1988 | Japan | 369/44.14 |
| 63-239625 | 10/1988 | Japan | 369/44.14 |
| 63-269330 | 11/1988 | Japan | 369/44.14 |
| 2161955 | 1/1986 | United Kingdom | 359/824 |

OTHER PUBLICATIONS

"Development of high performance head positioner for an optical disk storage system", Tetsu Yamamoto, Takashi Yumura, Hiroo Shimegi; SPIE vol. 695, Optical Mass Data Storage II, 1986; pp. 153–159.
"Industrial Linear Motor", Chap. 2, Linear DC Motor, p. 37, Table 2.10 (Pen Recorder Indicating Meter For Linear DC Motor).

Primary Examiner—Aristotelis Psitos
Assistant Examiner—P. W. Huber
Attorney, Agent, or Firm—Oblon, Spivak, McClelland, Maier & Neustadt

[57] ABSTRACT

In an electro-magnetic actuator, an objective lens is mounted on a lens holder which is elastically supported by two leaf springs and a focusing coil is wound around the lens holder. The lead springs is fixed on a carriage to which tracking coil is also fixed. Guide roller mechanisms are provided on the both sides of the tracking coil and are slidably mounted on guide rails, respectively. The tracking coil are so arranged as to be extended in magnetic gaps of magnetic circuits disposed between the carrier and the guide rails. In each of the magnetic circuit, first and second yokes are so faced to each other as to defined the magnetic gap, a pair of permanent magnets are interposed between the first and second yokes, a third yoke also so faced to the second yoke as to defined the magnetic gap, a pair of permanent magnets are also interposed between the second and third yokes, and a permanent magnet is provide at the first yoke to apply a magnetic flux to the focusing coil.

31 Claims, 36 Drawing Sheets

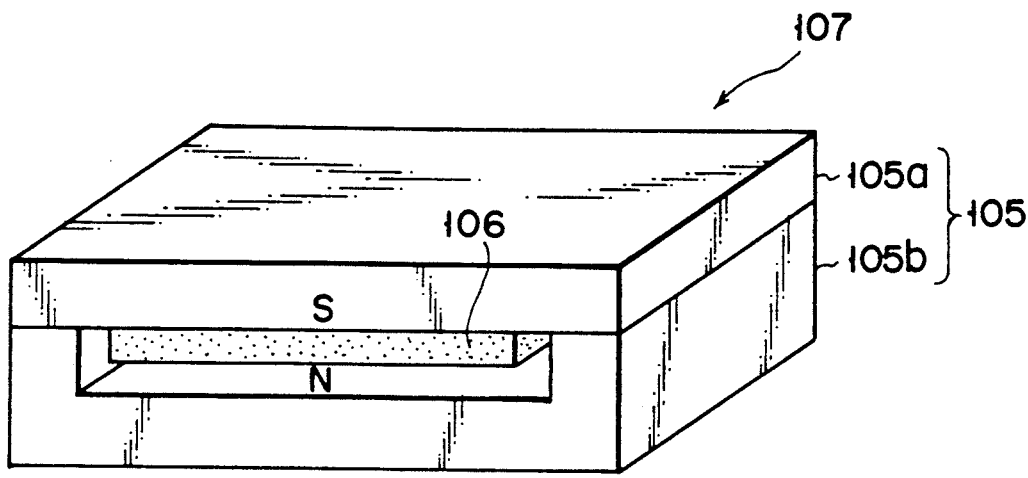
FIG. 2
(PRIOR ART)
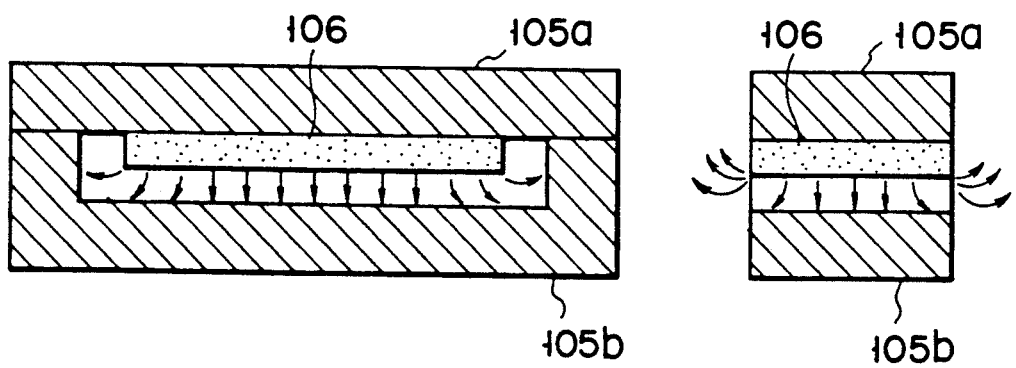
FIG. 3A
(PRIOR ART)
FIG. 3B
(PRIOR ART)

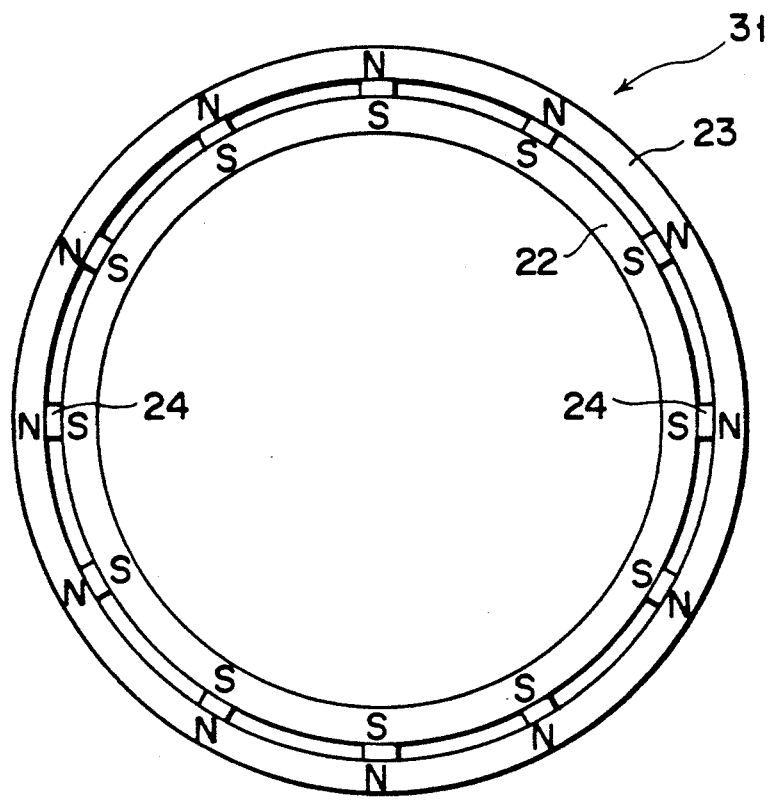
F I G. 11
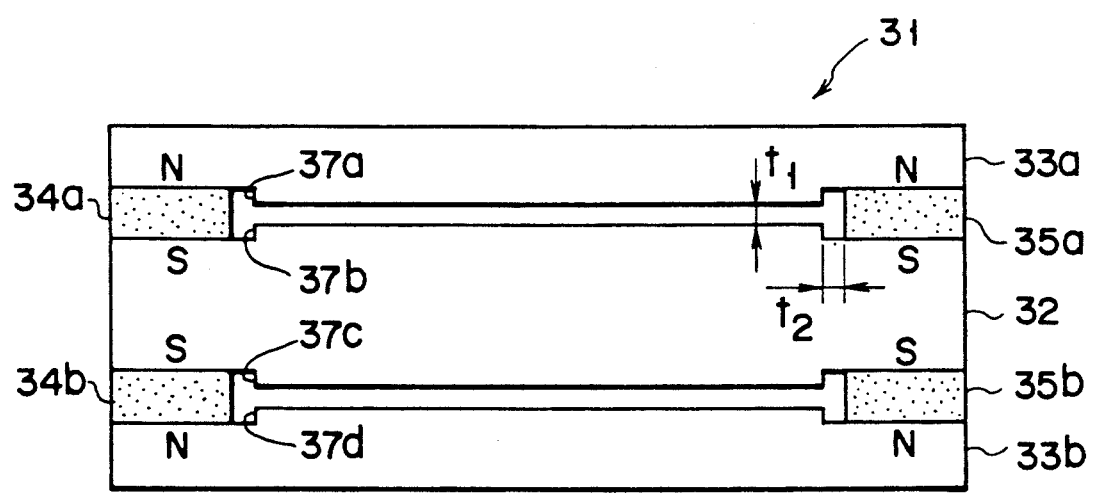
F I G. 12

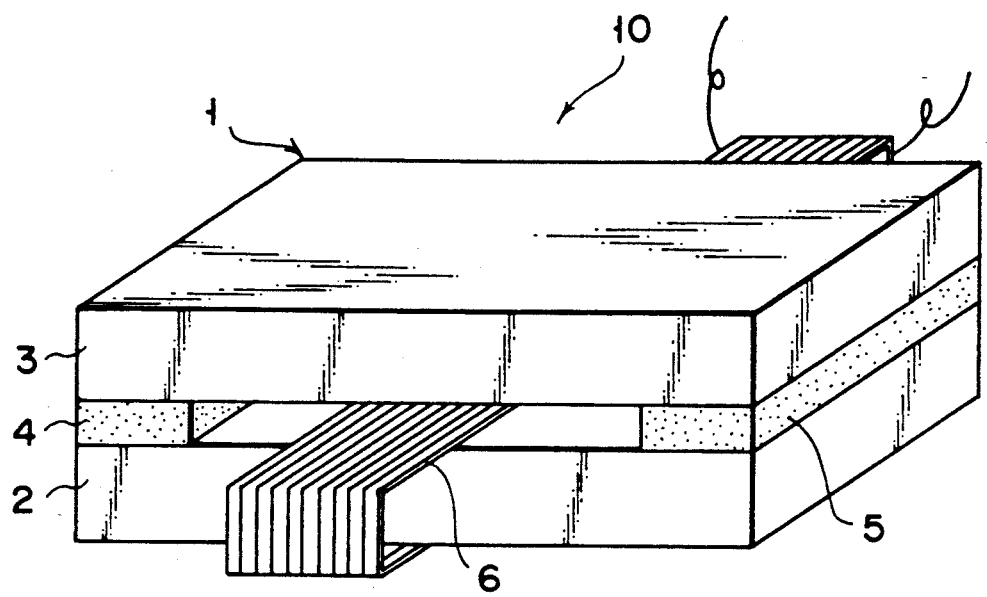
F I G. 13
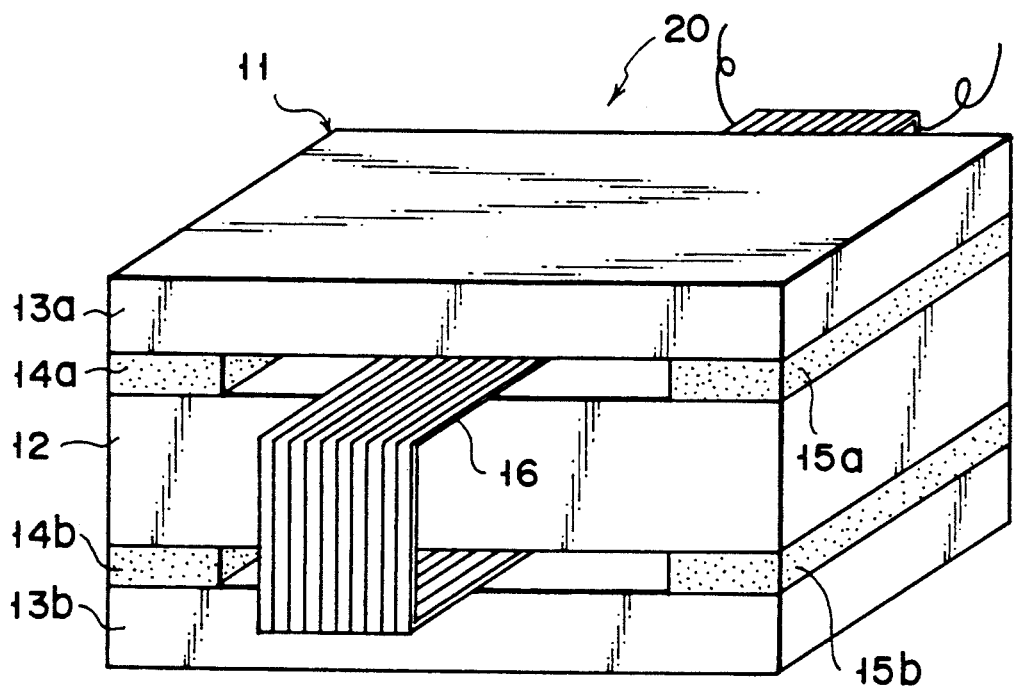
F I G. 14

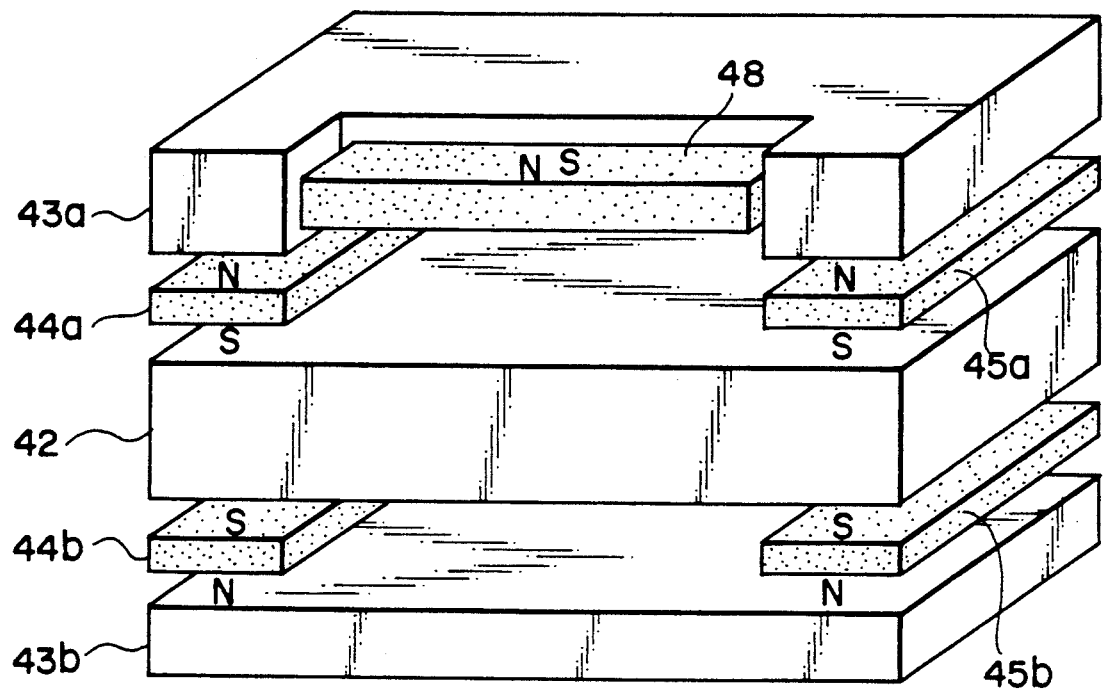
F I G. 15
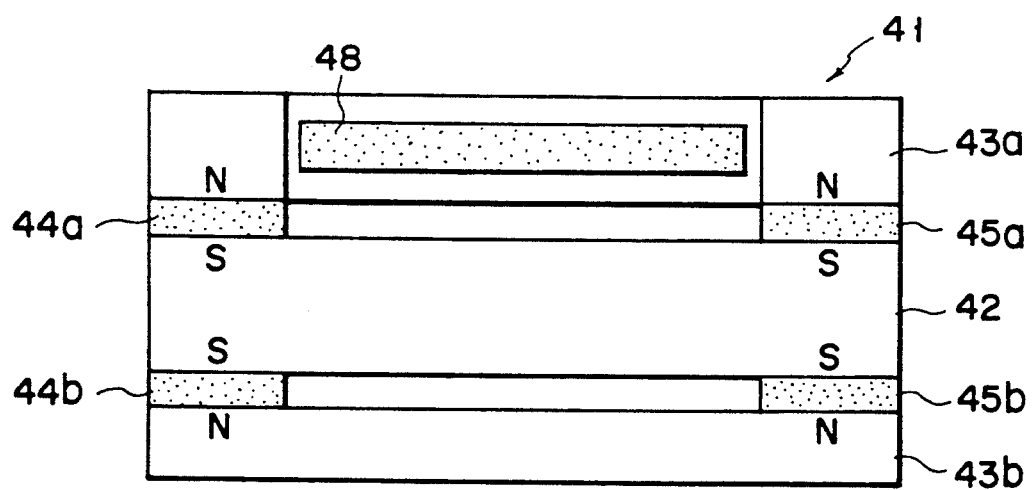
F I G. 16

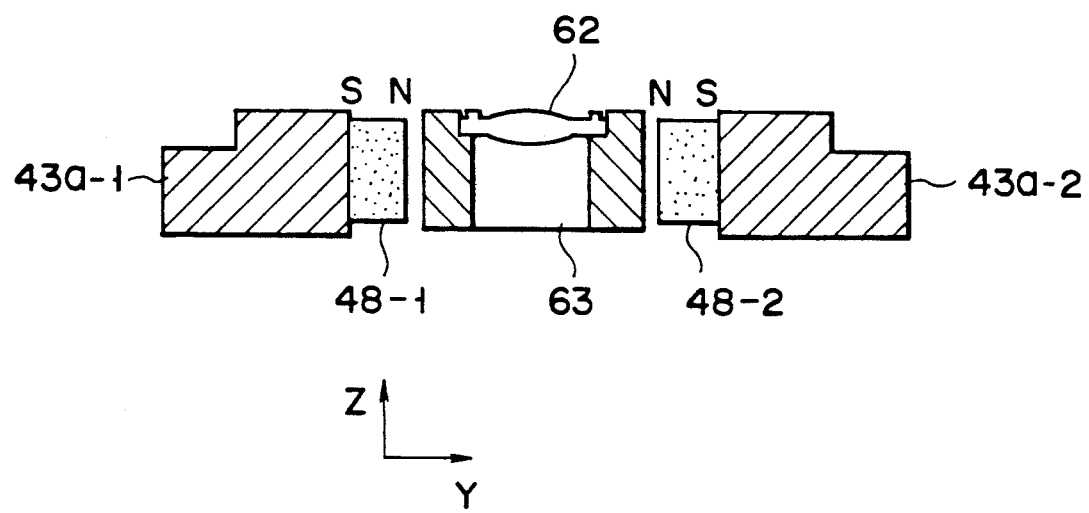
F I G. 23

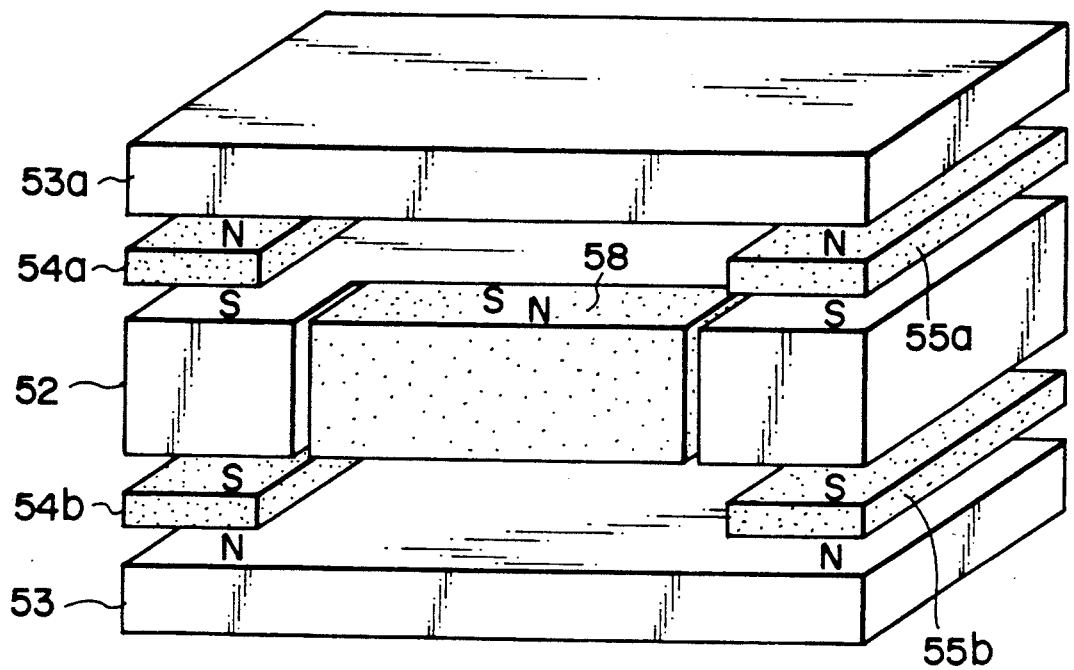
F I G. 25
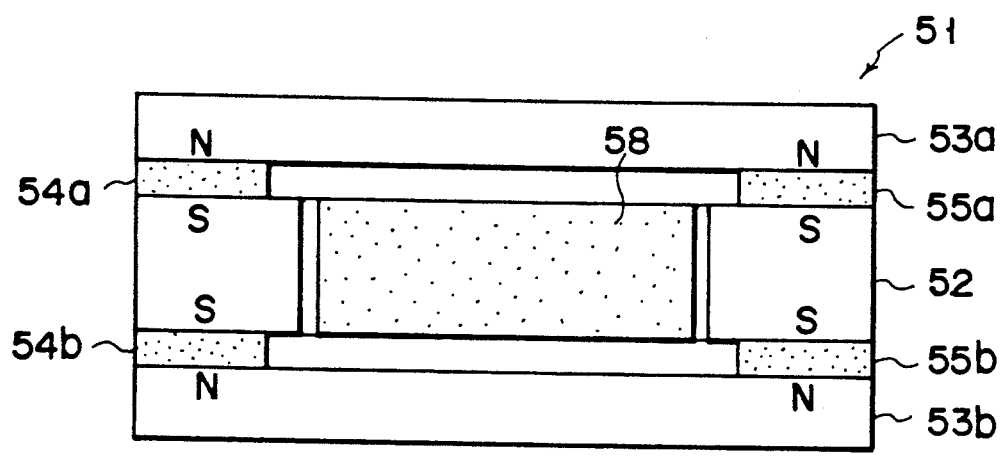
F I G. 26

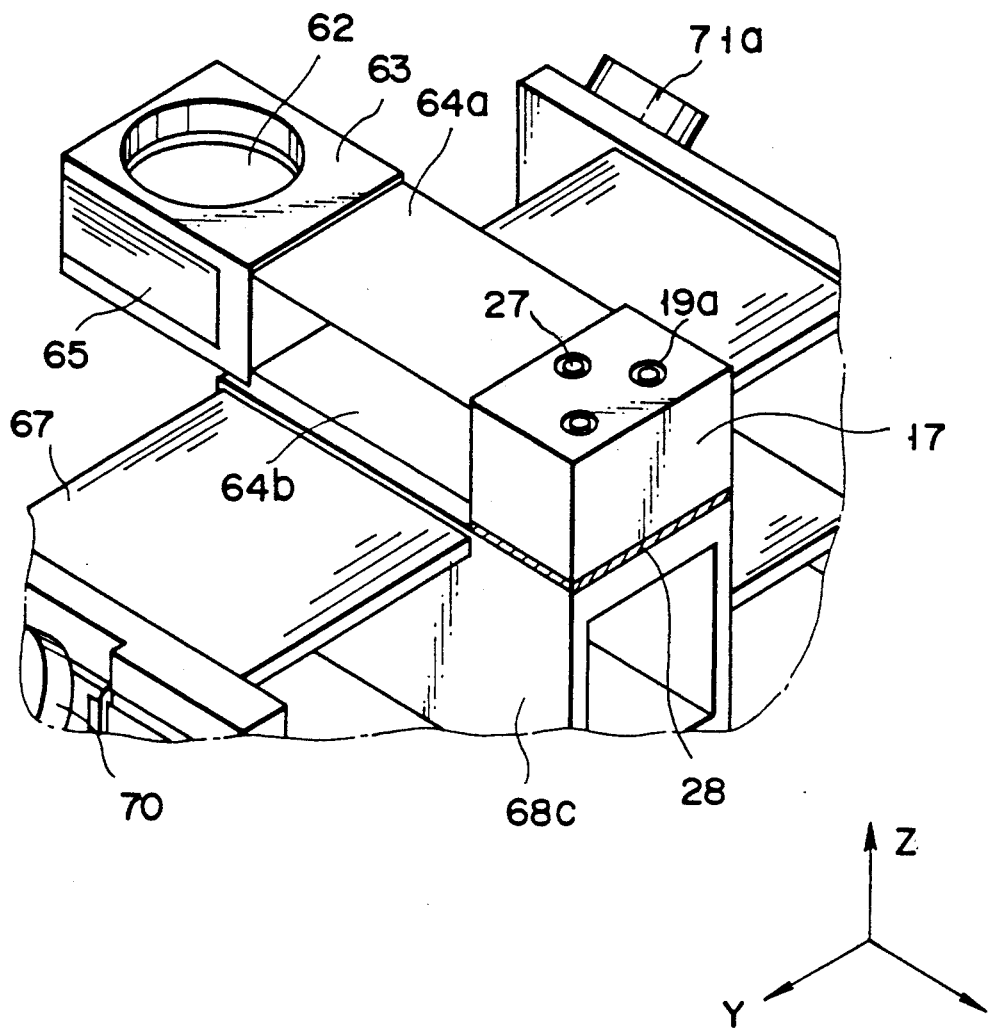
F I G. 35

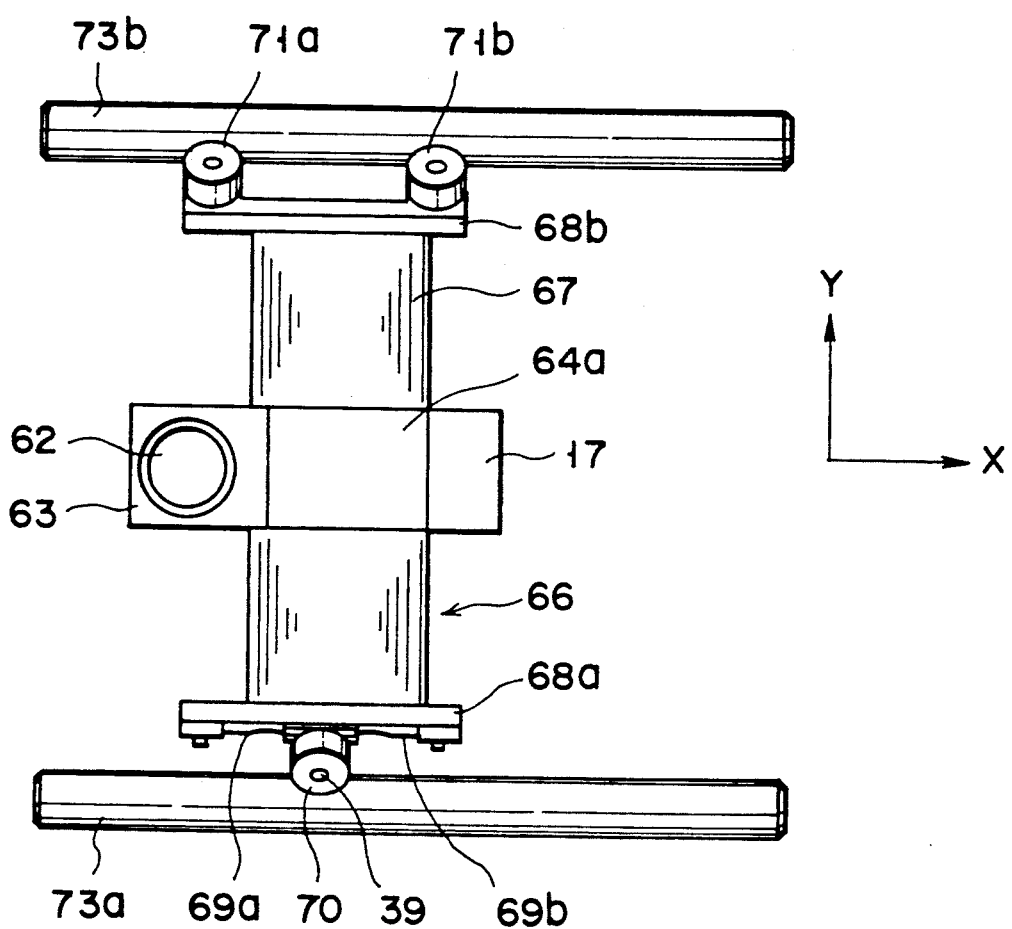
F I G. 40

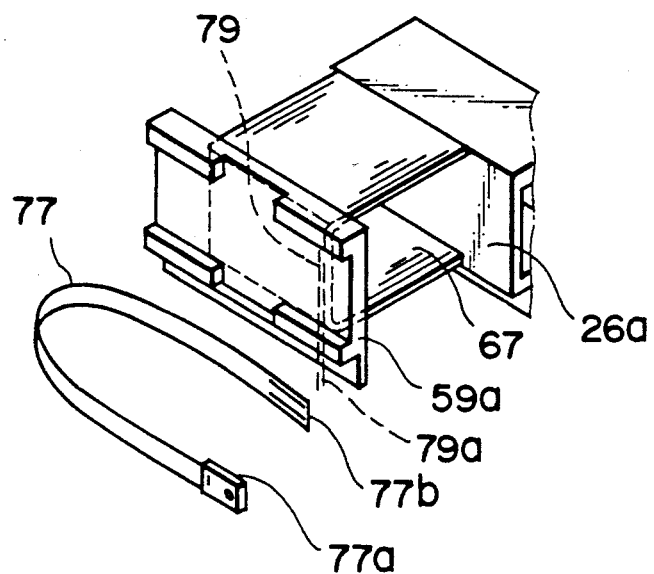
F I G. 43

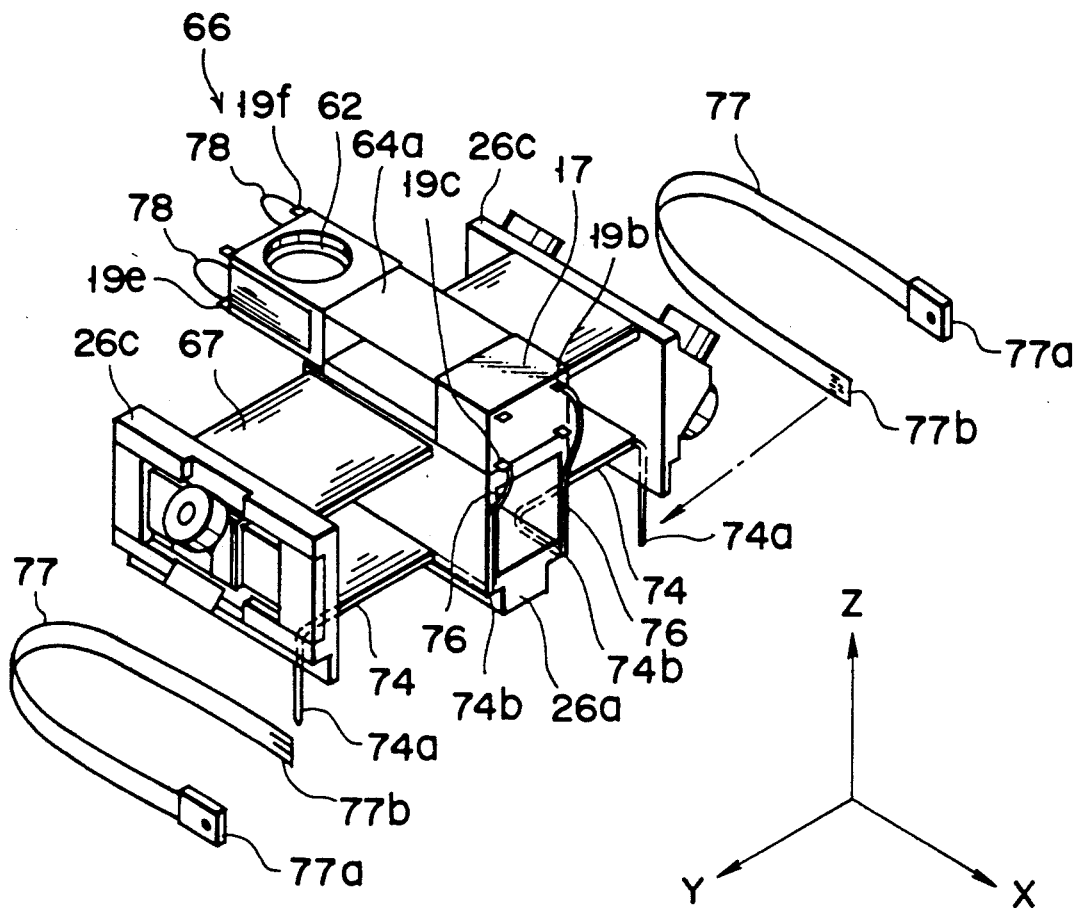
F I G. 44

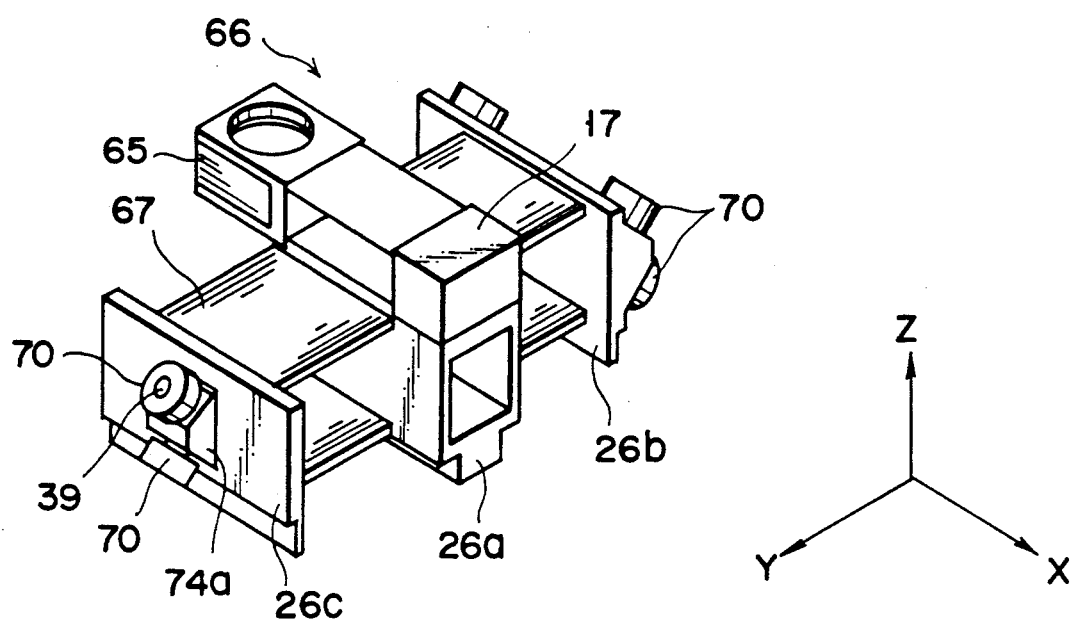
F I G. 48
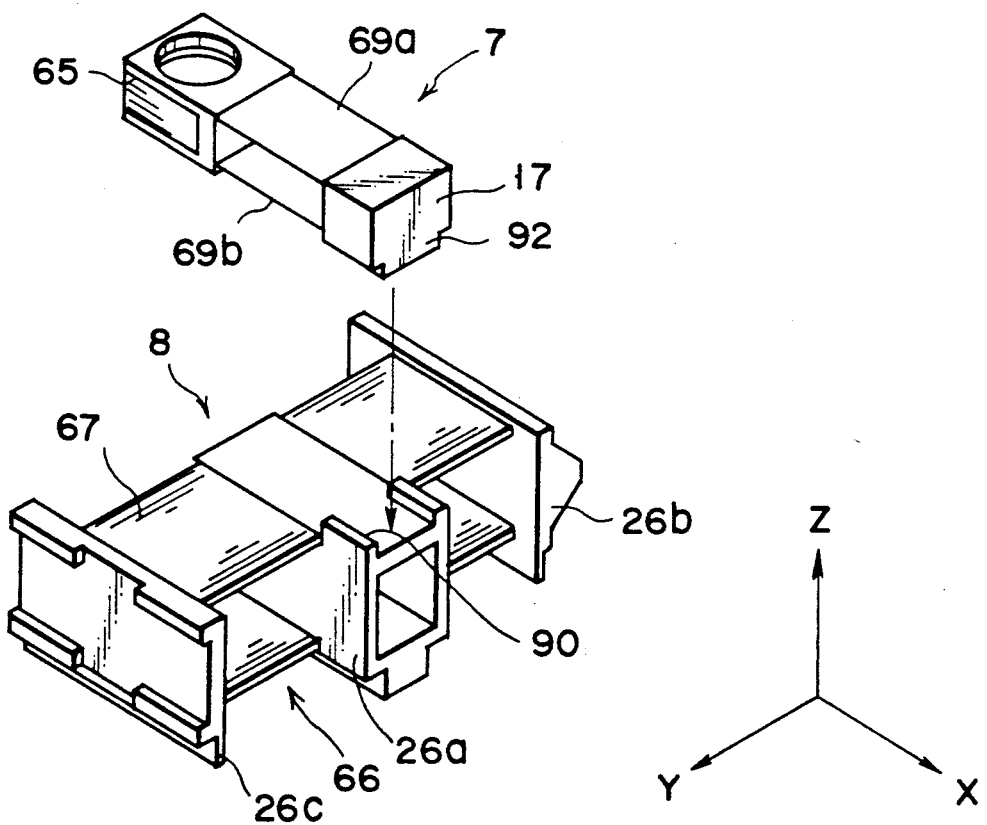
F I G. 49

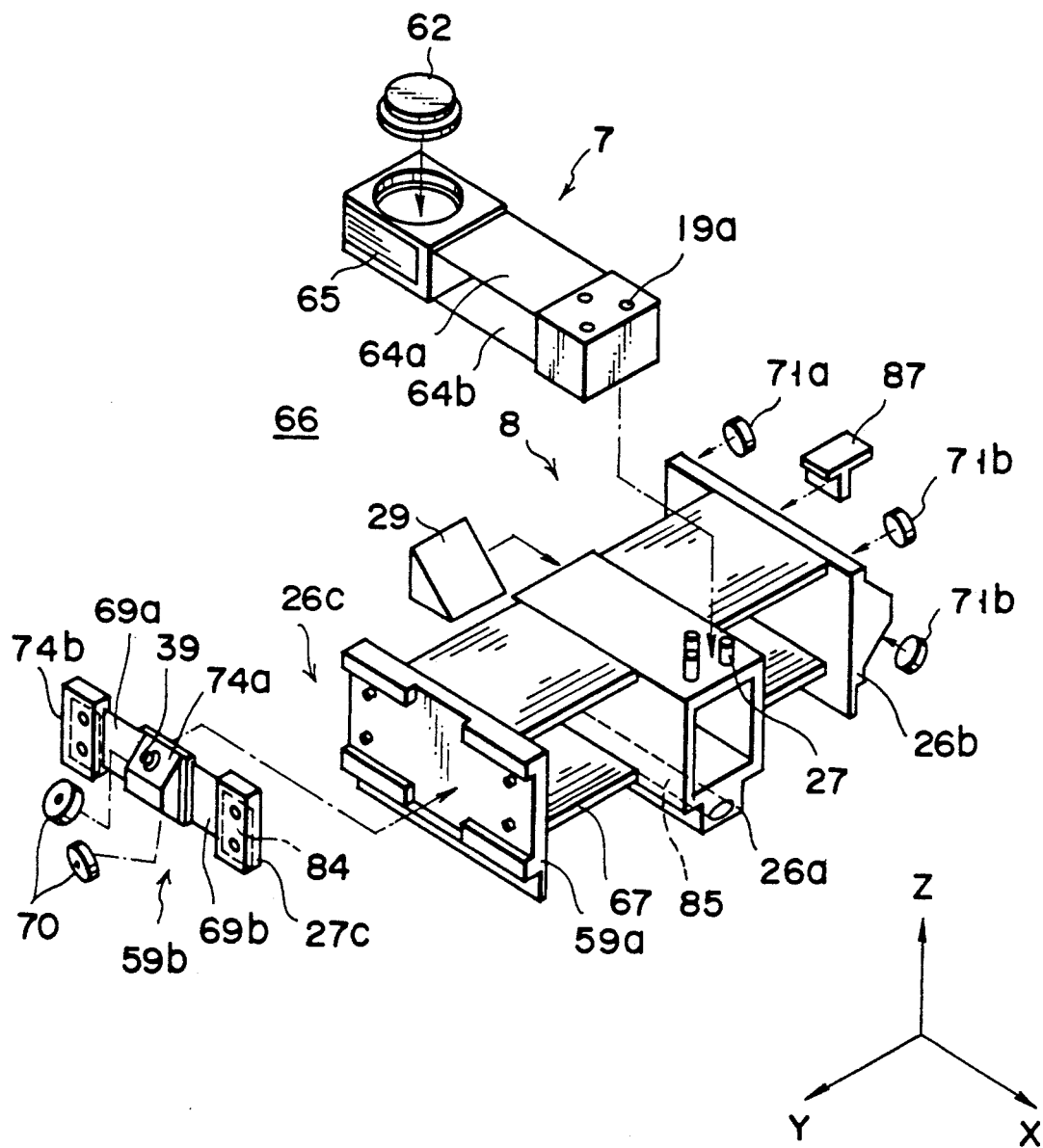
F I G. 52

LINEAR ACTUATOR FOR DRIVING AN OPTICAL HEAD INCORPORATED IN AN OPTICAL DISK

BACKGROUND OF THE INVENTION 1. 1. Field of the Invention

The present invention relates to an electro-magnetic actuator and an optical disk apparatus incorporating the same and, more particularly, to a linear actuator for driving an optical head incorporated in an optical disk apparatus for reproducing/recording information from-/in an optical recording medium by converging a laser beam onto the optical recording medium.

2. Description of the Related Art

An electro-magnetic actuator as an actuator for driving a head is currently widely used in various fields of, e.g., an optical disk apparatus and a magnetic disk apparatus. For example, as an electro-magnetic actuator for driving an optical head used in an optical disk apparatus, a mechanism as shown in FIG. 1 is known. In the mechanism shown in FIG. 1, an objective lens 102 for focusing a light beam from a light source onto an optical disk 101 is mounted on a movable member 103. The objective lens 102 can be finely moved by a short distance along its optical axis toward the optical disk 101 and can be also finely moved by a short distance in the radial direction of the optical disk 101 by a mechanism provided in a cove 104 to move the objective lens. A tracking driving mechanism for driving the objective lens 102 in the radial direction of the optical disk 101 by a comparatively long distance comprises a pair of magnetic circuits 107 each constituted by a yoke 105 and a permanent magnet 106 fixed to the yoke 105, a tracking coil 108 fixed to the movable member 103, linear guides 109 for regulating a moving direction of the movable member 103, and guide rollers 110 which can roll on the linear guides 109. The movable member 103 is roughly driven in the radial direction of the optical disk 101 by a Lorentz force generated by a current flowing through the tracking coil 108 and magnetic fluxes flowing in the magnetic circuits 107, and the objective lens 102 is finely driven by the above objective lens driving mechanism to form a light beam spot at a desired position on the surface of the optical disk 101, thereby recording or reproducing information in or from the optical disk 101.

As shown in FIG. 2, in the magnetic circuit 107 to be incorporated in such a mechanism, a plate-like yoke 105a and a yoke 105b having a substantially U-shaped section are connected to form the yoke 105, and the permanent magnet 106 is fixed on the inner surface of the yoke 105a and arranged in a space between the yokes 105a and 105b.

In the magnetic circuit 107 having the above arrangement, as shown in FIG. 3A, a magnetic path is formed such that not all of magnetic fluxes generated by the N pole of the permanent magnet 106 flow straight to the longitudinal section of the yoke 105b but some magnetic fluxes flow toward two short sides of the yoke 105b. In addition, as shown in FIG. 3B, magnetic fluxes generated by the end portion of the permanent magnet 106 form a magnetic path which returns directly to the yoke 105a through air outside the magnetic circuit. Therefore, a magnetic flux density distribution in a magnetic gap is not uniform along the inner surface of the yoke 105b but a magnetic flux density at the end portion becomes smaller than that at the center of the magnetic gap.

When the size of the magnetic circuit 107 is decreased, it becomes very difficult to maintain a uniform magnetic flux density distribution in the magnetic gap along the inner surface of the yoke 105a due to magnetic characteristics of the permanent magnet 106 or material characteristics such as magnetic saturation of the yoke 105. As a result, a considerably large amount of magnetic fluxes leak into air having a smaller permeability than that of the yoke 105. When a magnetic path is formed in this manner, magnetic fluxes at the center of the magnetic gap largely differ from those at its end portion. Therefore, if such a magnetic circuit is applied to the electro-magnetic actuator shown in FIG. 1, a generated driving force changes in accordance with the position of the movable member 103 and degrades uniformity of moving acceleration of the objective lens 102. As a result, positioning control of the objective lens 102 becomes unstable.

As described above, a magnetic path formed by the conventional magnetic circuit is not uniform along the inner surface of the magnetic gap, and it is very difficult to maintain uniformity of a magnetic flux density distribution in the magnetic gap if the magnetic circuit is made smaller in size. Therefore, if this magnetic circuit is applied to an electro-magnetic actuator, a generated driving force changes in accordance with the position of a movable member, resulting in unstable positioning control of an objective lens.

An optical system of an optical head of the mechanism shown in FIG. 1 generally comprises three systems, i.e., a guiding optical system for guiding a light beam from a light source, an optical pick-up system for focusing the light beam onto an optical disk and picking up the light beam from the optical disk, and a detecting system for detecting the light beam. More specifically, in the guiding optical system, a light beam emitted from a light source, e.g., a semiconductor laser is shaped and collimated. In the optical pick-up system, the optical pick-up system, the light beam transmitted from the guiding optical system is focused on a rotating optical disk by the objective lens 102. In the detecting system, the light beam modulated and reflected by a recording surface of the disk is focused on a photodetector and detected for signal reading and position detection. In the conventional optical head shown in FIG. 1, the guiding optical system and the detecting system having a considerably large total weight (generally 50 g or more) are mounted on the chassis 103 as a movable member. Therefore, in order to drive the optical head at a high speed, the magnetic circuit 107 capable of generating high power, i.e., the magnetic circuit 107 having a comparatively large size is required. In this case, since the size of the movable member is naturally increased, further limitations are imposed if the optical head must be housed and operated in a limited space in the optical disk apparatus.

Recently, a separate type optical head device shown in FIG. 4 in which a guiding optical system and a detecting system are separated from a movable member to reduce the weight of the movable member and realize high-speed driving has been used. In this separate optical head device, a lens bobbin 202 to which an objective lens 102 is connected is elastically supported by parallel leaf springs 204, thereby supporting the objective lens 102 to move parallel to its optical axis direction (Z direction). A flat type focusing coil 206 as a focusing driving system is wound around the side surface of the lens bobbin 202 to have its axis in the Y direction. The focusing coil 206 and a fixed magnetic circuit (not shown) form an electro-magnetic driving system in which a Lorentz force, i.e., a driving force for driving the objective lens 102 in the Z direction is generated in accordance with a Fleming's left-hand rule by the direction (X direction) of a current flowing through the focusing coil 206 and the direction (Y direction) of magnetic fluxes generated by a permanent magnet of the magnetic circuit. The lens bobbin 20 is moved by this driving force while equally curving the two leaf springs. That is, the objective lens 102 is driven in the optical axis direction. A reflecting mirror 240 is arranged below the objective lens 102 to deflect a light beam, emitted from a light source and passed through a fixed guiding optical system, through 90° and radiate the deflected light beam onto a disk 101. A light beam modulated and reflected by the upper surface of the disk 101 is guided to a detecting optical system by the reflecting mirror 240.

Guide rollers 110 such a bearings elastically supported by support pins 210 are arranged at both side surfaces of a carriage 208 as a movable member and roll along linear guides 109 with a circular section fixed on a base (not shown) and elongated in the X direction. Therefore, the carriage 208 is moved in the disk radial direction (X direction) while its two ends are supported by the linear guides 109. A tracking coil 214 is wound around a tracking coil bobbin portion 212 of the carriage 208 to have its axis in the X direction. The tracking coil 214 is inserted in a non-contacting state into a magnetic gap between a yoke and the permanent magnet of the magnetic circuit and forms a voice coil motor together with the magnetic circuit. This voice coil motor generates a Lorentz force, i.e., a driving force for driving the carriage 208 in the X direction by the direction (Y direction) of a current flowing through the tracking coil 214 and the direction (Z direction) of magnetic fluxes in the magnetic gap of the magnetic circuit. The carriage 208 is moved by this driving force while the rollers 110 roll on the linear guides 109. That is, the objective lens 102 is moved in the X direction.

Of the two conventional optical heads described above, in the optical head device shown in FIG. 1 in which both the guiding and detecting optical systems are mounted on the movable member 103, it is difficult to record/reproduce information at a high speed since reduction in weight of the movable member is limited.

In the separate type optical head device, in order to improve response characteristics upon X-direction driving of the movable member 208, it is preferred to sufficiently narrow the magnetic gap, i.e., move the tracking coil 214 inserted in the magnetic gap as close as possible to the yoke surface or the magnet surface opposing each other above and below the tracking coil 214. In order to allow the guide roller 110 to rotate on the linear guide 109 with a low frictional resistance, the rotating shaft of the guide roller and the linear guide direction must be set to be substantially perpendicular to each other. In addition, in order to restrict the optical head in a direction except for the tracking direction by a plurality of guide rollers 110, an inclination and a positional accuracy of each pin 210 for supporting the guide roller 110 must be set within predetermined allowable ranges. Since, however, mounting accuracies of the tracking coil 214 and the movable member 208 are actually not so high, it becomes difficult to maintain a non-contacting state between the tracking coil 214 and the yoke if the magnetic gap is made narrower. Similarly, since mounting accuracies of each pin 210 and the movable member 208 are not so high, it is difficult to set the inclination and positional accuracy of each pin 210 within allowable ranges.

In order to stabilize optical characteristics and Z-direction driving of the objective lens 102, a high mounting accuracy and inclination accuracy are required for the lens bobbin 202 or the focusing coil 206. However, a demand for a high mounting accuracy of the focusing coil 206, the tracking coil 214, the lens bobbin 202, the pin 210, the reflecting mirror 240, and the like, and a complicated shape of the separate optical head cause reduction in productivity in a manufacturing/assembling process of the optical head. The above demand for a high mounting accuracy of the pin 210, the lens bobbin 202, the focusing coil 206, and the like in the separate type optical head device is similarly present for a mounting accuracy between the movable member 103 and the guide roller support pin and between the movable member 103 and the optical pick-up 104 in the standard optical head device described above.

In addition, in order to realize an optical head which can perform recording/reproduction at a high speed in a future, an optical head in which a movable member is arranged so as not to produce an unnecessary vibration in a moving optical element and which can be driven without an inclination or offset of an optical axis by eliminating an unnecessary mass distribution must be developed.

SUMMARY OF THE INVENTION

It is an object of the present invention to provide an electro-magnetic actuator which can constantly provide a stable driving force.

It is another object of the present invention to provide an optical disk apparatus wherein a beam spot formed on an optical disk by a light beam emerged from an objective lens is precisely controlled.

It is still another object of the present invention to provide an optical disk apparatus which can achieve a small size, a light weight, and an improved productivity and can be driven at a high speed without a vibration and an inclination of an optical axis, thereby performing recording/reproduction of information at a high speed.

According to the invention, there is provided an apparatus for generating a driving force, comprising first and second yokes, having flat surfaces opposing each other via a gap and arranged in a first direction, for allowing magnetic fluxes to pas therethrough; first and second plate-like permanent magnets each having surfaces of one and another poles, separately arranged in the gap in a second direction perpendicular to the first direction, the surface of the one pole being fixed to the surface of the first yoke, and the surface of the another pole being fixed to the surface of the second yoke, the first and second plate-like permanent magnets supplying magnetic fluxes to the yokes to generate a magnetic field across the gap in the first direction; an electro-magnetic coil extending in the gap between the first and second plate-like permanent magnets, a current being supplied to the electro-magnetic coil in the gap in a third direction perpendicular to the first and second directions; and supporting means for supporting the electro-magnetic coil to move in the second direction, the electro-magnetic coil being moved in the second direction by a driving force generated by an interaction between the magnetic field and the current.

According to the invention, there is also provided an apparatus for generating a driving force, comprising a first yoke, having a flat surface, for passing magnetic fluxes; a second yoke, having one and opposite flat surfaces, the one surface opposing one surface of the first yoke via a first gap, and arranged in a first direction, for passing magnetic fluxes; a third yoke, having one flat surface opposing the opposite surface of the second yoke via a second gap, and arranged in the first direction, for passing magnetic fluxes; first and second plate-like permanent magnets each having surfaces of one and another poles, separately arranged in the first gap in a second direction perpendicular to the first direction, the surface of the one pole being fixed to the surface of the first yoke, and the surface of the another pole being fixed to the one surface of the second yoke, the first and second plate-like permanent magnets supplying magnetic fluxes to the yokes to generate a first magnetic field across the first gap in the first direction; third and fourth plate-like permanent magnets each having surfaces of one and another poles, separately arranged in the second gap in the second direction, the surface of another pole being fixed to the opposite surface of the second yoke, and the surface of the one pole being fixed to the one surface of the third yoke, the third and fourth plate-like permanent magnets supplying magnetic fluxes to the yokes to generate a second magnetic field across the second gap in the first direction; a first electro-magnetic coil extending in the first and second gaps between the first and second plate-like permanent magnets, first and second current components being supplied in opposite directions in the first and second gaps in a third direction perpendicular to the first and second directions; supporting means for supporting the first electro-magnetic coil to move in the second direction, the first electro-magnetic coil being moved in the second direction by a first driving force generated by interactions between the first magnetic field and the first current component and between the second magnetic field and the second current component; magnetic field generating means, arranged close to one of the first and second yokes, for generating a third magnetic field in the third direction; and a second electro-magnetic coil held on the supporting means to move in the first direction and having a section in which a third current component is flowed in the second direction, the second electro-magnetic coil being moved in the first direction by a second driving force generated by an interaction between the third magnetic field and the third current.

According to the invention, there is further provided a system for optically reproducing information from an optical recording medium, comprising focusing means for focusing a light beam onto the optical recording medium in a first direction; driving force generating means for generating a first driving force to convey the focusing means in a second direction perpendicular to the first direction, the driving force generating means including first and second magnetic circuit means arranged with an interval therebetween in a third direction perpendicular to the first and second directions, conveyor means for conveying the focusing means in the second direction, and moving means for moving the focusing means in the first direction, each of the first and second magnetic circuit means being constituted by a first yoke, having a flat surface, for passing magnetic fluxes, a second yoke, having one and opposite flat surfaces, the one surface opposing one surface of the first yoke via a first gap, and arranged in the first direction, for passing magnetic fluxes, a third yoke, having one flat surface, the one surface opposing the opposite surface of the second yoke via a second gap, and arranged in the first direction, for passing magnetic fluxes, first and second plate-like permanent magnets each having surfaces of one and another poles, separately arranged in the first gap, the surface of the one pole being fixed to the surface of the first yoke, and the surface of the another pole being fixed to the one surface of the second yoke, the first and second plate-like permanent magnets supplying magnetic fluxes to the yokes to generate a first magnetic field across the first gap in the first direction, third and fourth plate-like permanent magnets each having surfaces of one and another poles, separately arranged in the second gap in the second direction, the surface of the another pole being fixed to the opposite surface of the second yoke, and the surface of the one pole being fixed to the one surface of the third yoke, the third and fourth plate-like permanent magnets supplying magnetic fluxes to the yokes to generate a second magnetic field across the second gap in the first direction, and magnetic field generating means, arranged close to one of the first and second yokes, for generating a third magnetic field in the third direction, the conveyor means including a first electro-magnetic coil having first and second sections extending in the first and second magnetic circuits, each of the first and second sections extending in the first and second gaps between the first and second plate-like permanent magnets, and first and second current components being supplied in opposite directions in the first and second gaps in the third direction in each of the first and second sections, and first supporting means for supporting the first electro-magnetic coil to be conveyed in the second direction, the first electro-magnetic coil being conveyed in the second direction by a first driving force generated by interactions between the first magnetic field and the first current component and between the second magnetic field and the second current component, and the moving means being constituted by a second electro-magnetic coil having a section in which a third current is flowed in the second direction, and second supporting means, held on the first supporting means, for supporting the second electro-magnetic coil and the focusing means to move in the first direction, the focusing means and the second electro-magnetic coil being moved in the first direction by a second driving force generated by an interaction between the third magnetic field and the third current; and optical guide means for guiding light beams to the focusing means being conveyed.

According to the invention, there is still further provided an optical head assembly for scanning an optical recording medium with a light beam, comprising focusing means, having an optical axis, for focusing a light beam onto a surface of the optical recording medium; first electro-magnetic coil means for generating a driving force for moving the focusing means in a first direction along the optical axis; supporting means, having one and the other end portions, for suspending the focusing means and the electro-magnetic coil means to move in the first direction; a first structure including a first resin portion to which the electromagnetic coil means and one end portion of the supporting means are fixed and a second resin portion to which the other end portion of the supporting means is fixed, the first and second resin portions being integrally molded; second electro-magnetic coil means for generating a driving force for moving the first structure in a second direction perpendicular to the first direction; and a second structure having a third resin portion to which the second electro-magnetic coil means is fixed, the third resin portion being integrally molded, the first structure being fixed to the second structure, and the first and second structures being capable of moving in the second direction.

According to the invention, there is furthermore provided an apparatus for reproducing information from an optical recording medium, comprising an optical head assembly for scanning the optical recording medium with a light beam, the assembly including focusing means, having an optical axis, for focusing a light beam onto a surface of the optical recording medium, first electro-magnetic coil means for generating a driving force for moving the focusing means in a first direction along the optical axis, supporting means, having one and the other end portions, for suspending the focusing means and the electro-magnetic coil means to move in the first direction, a first structure including a first resin portion to which the focusing means, the electro-magnetic coil means, and one end portion of the supporting means are fixed and a second resin portion to which the other end portion of the supporting means is fixed, the first and second resin portions being integrally molded, second electro-magnetic coil means for generating a driving force for moving the first structure in a second direction perpendicular to the first direction, a second structure having a third resin portion to which the second electro-magnetic coil means is fixed, the third resin portion being integrally molded, the first structure being fixed to the second structure, and the second structure being capable of moving in the second direction, and first and second guide roller mechanisms, fixed to the second structure, for conveying the second structure; first and second guide rails, extending parallel to each other in the second direction, for guiding the first and second guide roller mechanisms, respectively; means for generating a magnetic field for causing the first electro-magnetic coil to generate a driving force; and means for generating a magnetic field for causing the second electro-magnetic coil to generate a driving force.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a perspective view schematically showing a magnetic circuit of the optical head apparatus shown in FIG. 1;

FIGS. 3A and 3B are longitudinal sectional views showing the magnetic circuit shown in FIG. 2;

FIGS. 9, 10, 11, and 12 are side views each showing a magnetic circuit incorporated in another embodiment of the present invention;

FIGS. 13 and 14 are perspective views showing actuators having magnetic circuits shown in FIGS. 6 and 9, respectively, which incorporate coils;

FIGS. 15 and 16 are exploded perspective and perspective views, respectively, showing a magnetic circuit incorporated in an actuator according to still another embodiment of the present invention;

FIG. 23 is a sectional view showing a lens holder and associated parts taken along a line B—B of the optical disk apparatus shown in FIG. 18;

FIGS. 25 and 26 are exploded perspective and perspective views showing a magnetic circuit incorporated in an actuator according to still another embodiment of the present invention;

FIG. 35 is an enlarged perspective view showing a part of the carriage shown in FIG. 20;

FIG. 40 is a plan view showing the carriage shown in FIG. 20;

FIG. 43 is a perspective view partially showing a tracking coil and a wiring structure for explaining an electrical connection at a stationary side of the optical disk apparatus shown in FIG. 42;

FIG. 44 is a perspective view showing a carriage for explaining an electrical connection between a focusing coil and a tracking coil shown in FIG. 42;

FIG. 48 is a perspective view showing a modification of a carriage not having a pin supporting leaf spring;

FIGS. 49, 50, and 51 are perspective and sectional views each showing a modification of a structure for bonding upper and lower structures of a carriage; and FIG. 52 is a perspective view showing the carriage shown in FIG. 20.

DETAILED DESCRIPTION OF THE PREFERRED EMBODIMENTS

Figure 1:
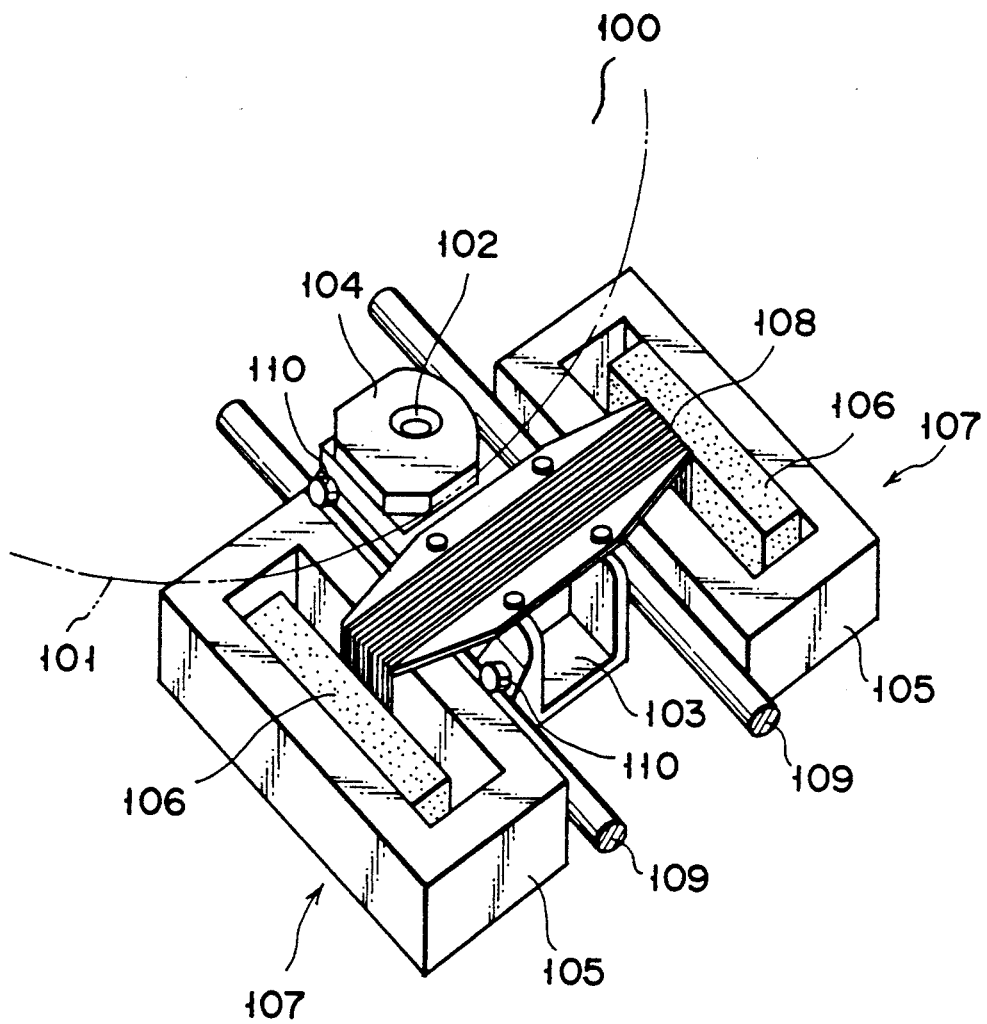
FIG. 1 is a perspective view schematically showing a conventional optical head apparatus.
Figure 4:
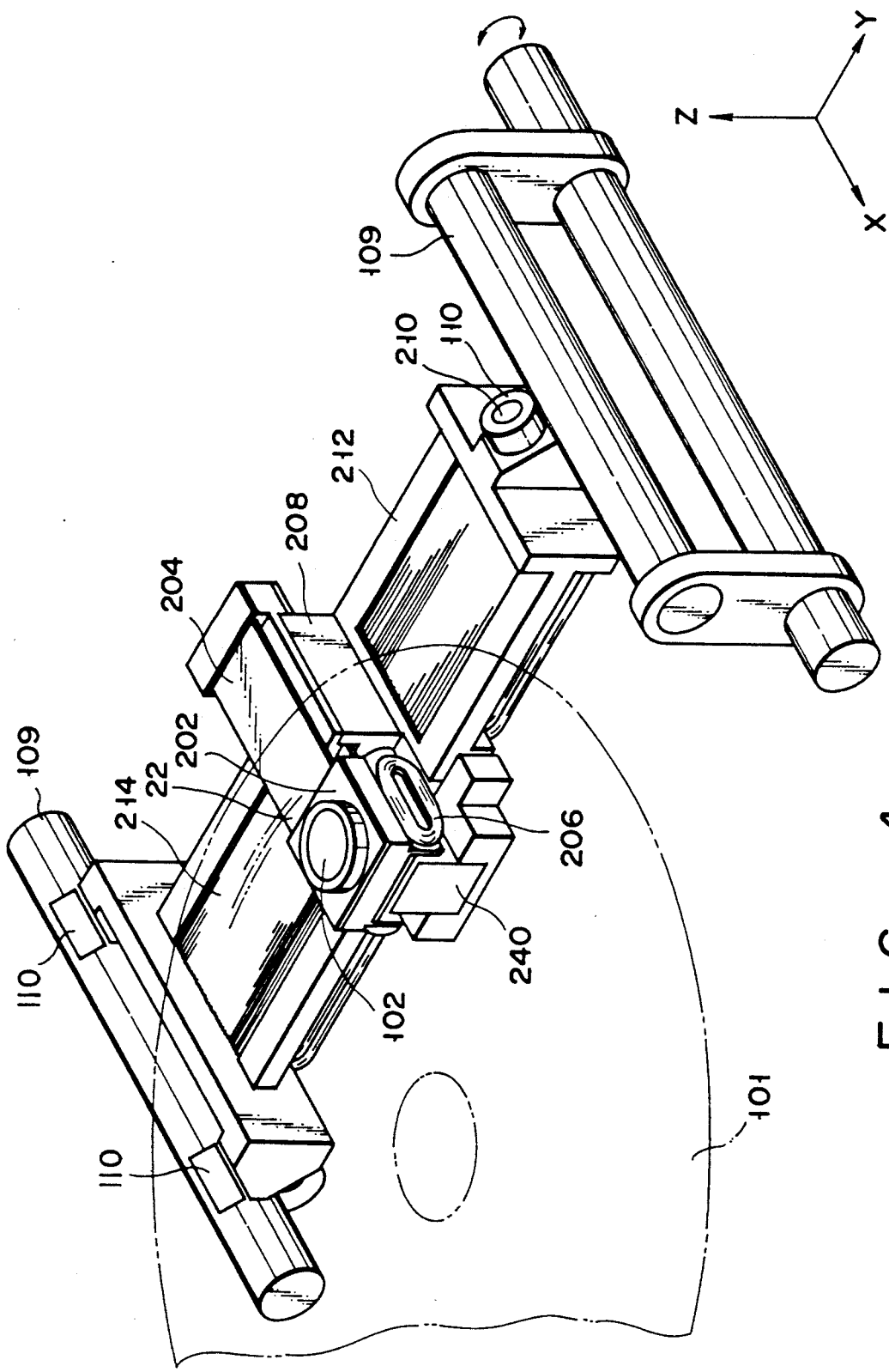
FIG. 4 is a perspective view schematically showing a conventional optical head apparatus different from that shown in FIG. 1.
Figure 5:
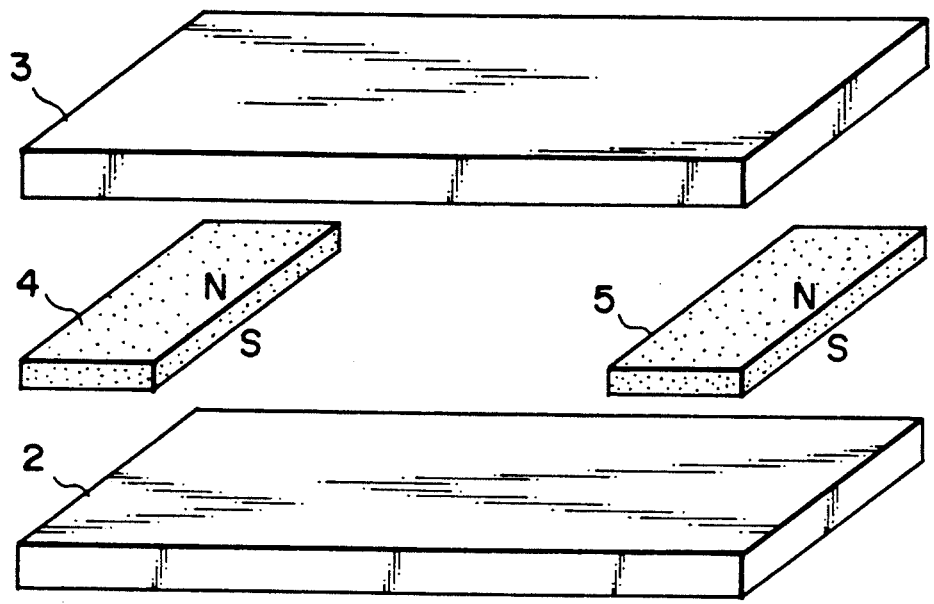
FIGS. 5 and 6 are exploded perspective and perspective views, respectively, showing a magnetic circuit incorporated in an actuator according to an embodiment of the present invention.
Figure 6:
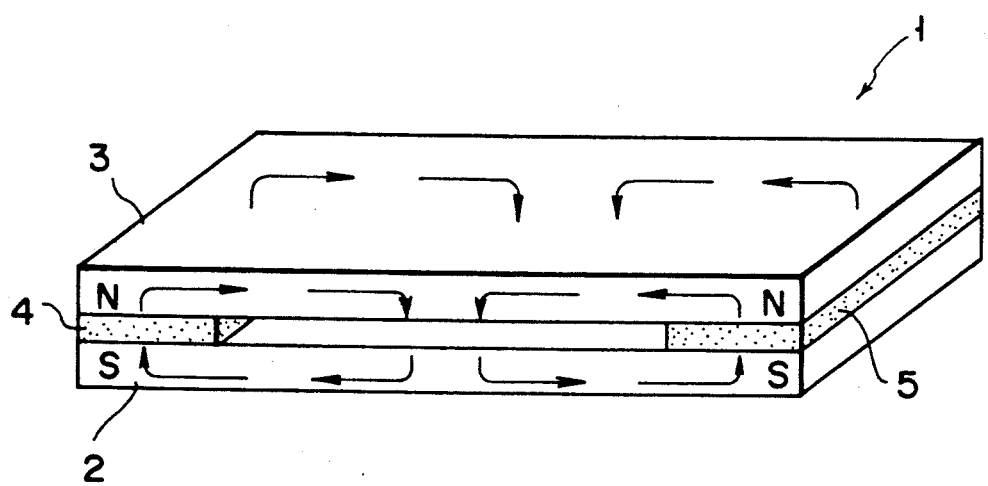

FIGS. 5 and 6 are exploded perspective and perspective views showing a magnetic circuit of an electromagnetic actuator according to the first embodiment of the present invention. Referring to FIGS. 5 and 6, a magnetic circuit 1 comprises two plate-like yokes 2 and 3 having the same shape and size and two plate-like permanent magnets 4 and 5 having the same shape and size. The permanent magnets 4 and 5 are arranged to be separated from each other so that the same poles of the permanent magnets 4 and 5 are in contact with the same yoke. Opposing surfaces of the yokes 2 and 3 are formed flat, and the thicknesses of the permanent magnets 4 and 5 in magnetization directions are equal to each other. Therefore, a distance between the opposite surfaces of the yokes 2 and 3, i.e., a gap length is maintained constant along the opposite surfaces. A space as a magnetic gap surrounded by the yokes 2 and 3 and the permanent magnets 4 and 5 is a rectangular parallelepiped. In order to obtain a long magnetic gap, the permanent magnets 4 and 5 are arranged on side end portions of the yokes 2 and 3, respectively.

Figure 7:
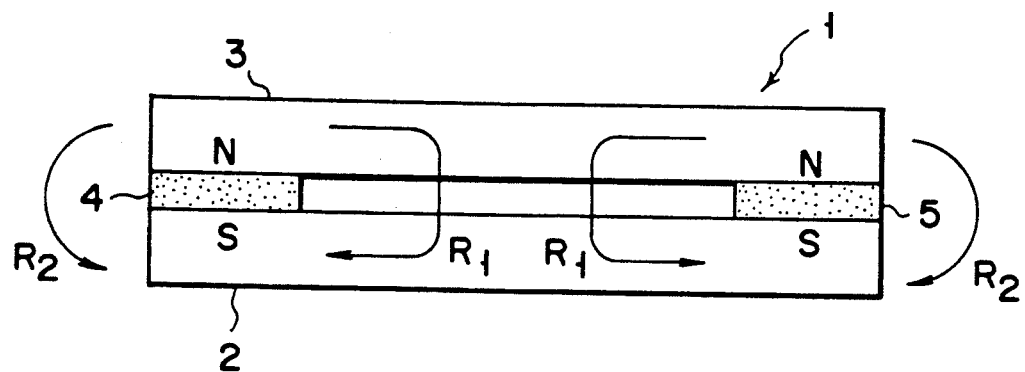
FIGS. 7 and 8 are sectional and side views, respectively, schematically showing a magnetic path of the magnetic circuit shown in FIGS. 5 and 6.

In the magnetic circuit 1 shown in FIG. 6, magnetic fluxes generated by the N poles of the permanent magnets 4 and 5 flow from the magnetic gap to the yoke 2 through the yoke 3 and return to the S poles of the magnets 4 and 5, thereby forming paths R1 as shown in FIG. 7. As shown in a front view of FIG. 7, in the magnetic circuit 1, flows of magnetic fluxes which return through air around the magnetic circuit without passing through the magnetic gap, i.e., magnetic paths R2 are generated in addition to the magnetic paths R1. Magnetic fluxes flow in air by a longer distance in the magnetic paths R2 in which magnetic fluxes arcuately flow outside the magnetic circuit 1 than in the magnetic paths R1 in which magnetic fluxes flow in the magnetic gap from the yoke 3 to the yoke 2 by a shortest distance. Since a permeability of air is much smaller than that of the yoke 2 or 3, magnetic fluxes do not easily flow in air. Therefore, most of magnetic fluxes generated by the N poles return to the S poles through the magnetic paths R1. As described above, since the distance between the opposite surfaces of the yokes 2 and 3 is constant along the surfaces, a distribution of magnetic fluxes in the magnetic gap is substantially constant along the surfaces.

A magnetic circuit obtained by decreasing the size of the magnetic circuit having the above arrangement will be described below in comparison with a magnetic circuit obtained by decreasing the size of a conventional magnetic circuit shown in FIG. 2. When the conventional magnetic circuit shown in FIG. 2 is made compact in size, the yoke 105 causes magnetic saturation to prevent an easy flow of magnetic fluxes. Therefore, magnetic fluxes leak from a magnetic gap into air to change a magnetic flux density in the surface direction in the magnetic gap. In the magnetic circuit shown in FIG. 6, however, if the yoke 3 causes magnetic saturation, magnetic fluxes exceeding saturated magnetic fluxes do not flow into a portion of the yoke between hatched virtual sections shown in FIG. 8. The magnetic fluxes flow through magnetic paths R2x and R2y without passing though the sections. (Suffixes x and y indicate flow directions of magnetic fluxes.) Therefore, magnetic fluxes passing through the magnetic gap do not change even in a magnetic saturation state, and the magnetic flux density distribution is substantially maintained constant even if the magnetic circuit 1 is made compact in size. In the conventional magnetic circuit shown in FIG. 2, the yoke 105, the permanent magnet 106, the magnetic gap, and the yoke 105b are so arranged as to be stacked with each other in a direction perpendicular to the magnetic gap. In the magnetic circuit shown in FIG. 8, however, since the magnetic gap and the permanent magnets 4 and 5 are arranged in parallel with each other, the thickness of the magnetic circuit can be decreased. In addition, when an electromagnetic actuator 10 is constituted such that a coil 6 is inserted in a magnetic gap as shown in FIG. 13 or 14, the coil 6 can stably generate a driving force at any position in the magnetic gap upon power supply and can smoothly move in the magnetic gap. Therefore, when the coil 6 is connected to a recording/reproduction head of an optical disk apparatus or a magnetic disk apparatus, e.g., an objective lens or a magnetic head to drive the head, information of interest can be accessed at a high speed by the head.

Figure 8:
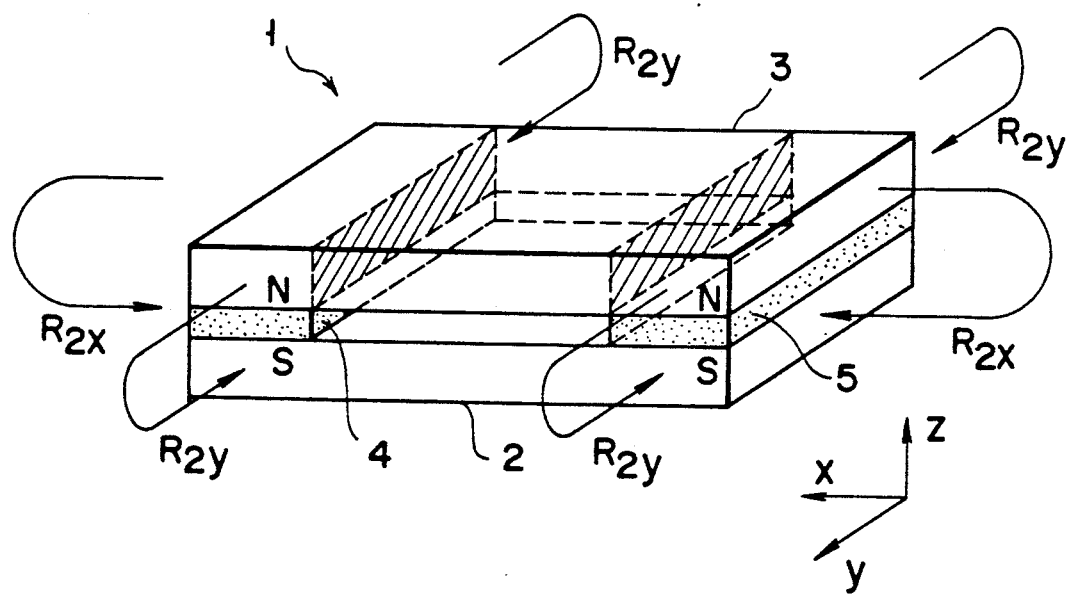
Figure 9:
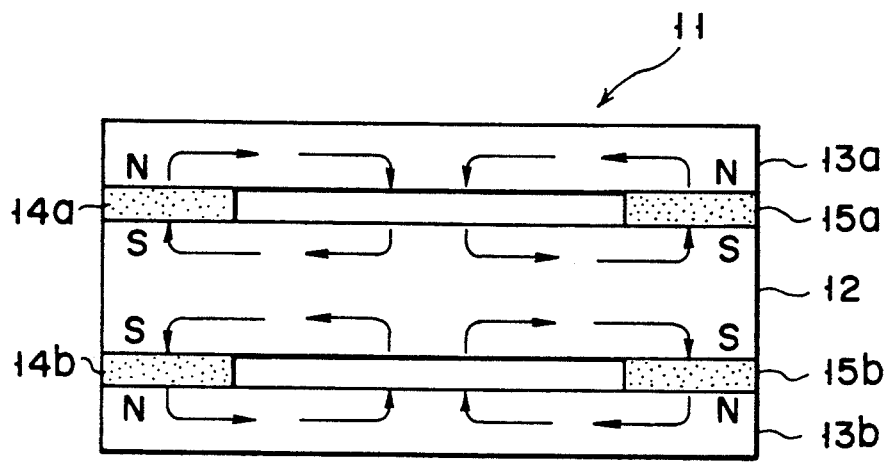

FIG. 9 shows a magnetic circuit of an electro-magnetic actuator according to the second embodiment o the present invention. In a magnetic circuit 11 shown in FIG. 9, a yoke 12 has a thickness twice that of yokes 13a and 13b, and permanent magnets 14a and 15a and permanent magnets 14b and 15b are arranged such that their magnetization directions are opposite to each other. That is, the magnetic circuit 11 has a structure in which two magnetic circuits 1 shown in FIG. 8 are stacked in the magnetization direction. The magnetic circuit 11 forms two magnetic gaps by the four permanent magnets 14a, 14b, 15a, and 15b.

In the magnetic circuit 11 having the above structure, a magnetic flux density distribution in each of the two magnetic gaps is uniform along the opposite surfaces, and almost no change is produced in the distribution even when the circuit is made small in size. In addition, in an electro-magnetic actuator 20 in which a coil 16 is wound to extend through the two magnetic gaps of the magnetic circuit 11 as shown in FIG. 14, the area of an effective winding portion of the coil 16 is increased to be about twice that of an effective winding portion of the magnetic circuit shown in FIG. 13 to largely improve an operation efficiency of the coil, thereby increasing a driving force. Therefore, when the coil 16 is connected to a recording/reproduction head of an optical disk apparatus or a magnetic disk apparatus, i.e., an objective lens or a magnetic head to drive the head, information of interest can be accessed at a higher speed with a higher precision.

Figure 10:
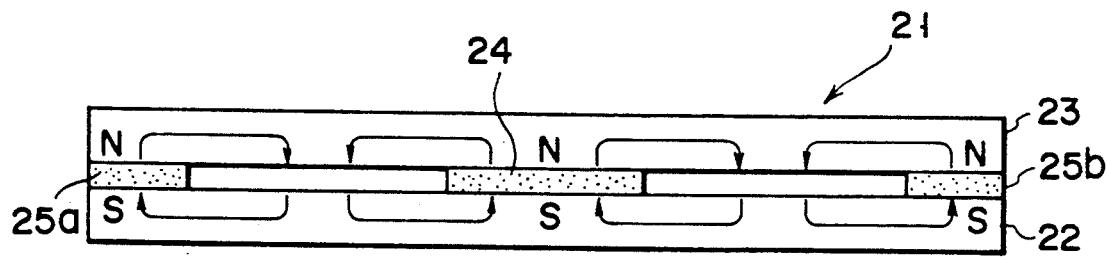

FIG. 10 shows a magnetic circuit of an electro-magnetic actuator according to the third embodiment of the present invention. A magnetic circuit 21 shown in FIG. 10 has a structure in which two magnetic circuits 1 shown in FIG. 6 are stacked in parallel with each other in the magnetization direction. A permanent magnet 24 has a size twice that of each of permanent magnets 25a and 25b, and two magnetic gaps formed by the permanent magnets 24, 25a, and 25b have the same shape.

The magnetic circuit 21 having the above structure can simultaneously drive two coils (not shown) by using the two magnetic gaps. The two coils can be connected to a single movable member or different movable members. In the magnetic circuit 11 or 21 shown in FIG. 9 or 10, respectively, any number of magnetic circuits 1 can be arranged in series or parallel with each other in the magnetization direction of the permanent magnets. In addition, series and parallel arrangements can be simultaneously used. As shown in FIG. 11, for example, the magnetic circuits 21 shown in FIG. 10 may be connected to form a ring-like magnetic circuit 31. In this case, a coil (not shown) is arranged at each magnetic gap, and power is applied to these coils to obtain a rotational driving force. The coils can be connected to a single movable member or different movable members.

FIG. 12 shows a magnetic circuit of an electro-magnetic actuator according to the fourth embodiment of the present invention. In a magnetic circuit 31 shown in FIG. 12, permanent magnets 34a, 34b, 35a, and 35b have different thicknesses from those of their magnetic gaps, and yokes 32 and 33a and yokes 32 and 33b slightly project in their magnetic gaps in the direction of thickness of the gaps. Distances (i.e., magnetic gaps) between opposite surfaces of projections 37a, 37b, 37c, and 37d are constant along the surfaces. A small gap t2 is formed between each of the magnets 34a, 34b, 35a, and 35b and the magnetic gap. Assuming that the thickness of the magnetic gap is t1, the magnetic circuit is arranged to satisfy a relation of t1≦t2. Other arrangements are the same as the magnetic circuit shown in FIG. 9.

In the magnetic circuit 31 having the above structure, the magnetic gap is narrowed by the projections even if the thicknesses of the permanent magnets remain the same. Therefore, the thickness of the permanent magnet can be increased relative to the magnetic gap to sufficiently increase a magnetic flux density in the magnetic gap. Similarly, a driving force of a coil (not shown) arranged in the magnetic gap can be improved.

The projection portion need not be formed for each yoke as in the magnetic circuit 31 shown in FIG. 12. For example, the projections 37a and 37b may be formed for only the yokes 33a and 33b, and the yoke 32 may be a normal flat plate.

FIGS. 15 and 16 show a magnetic circuit of an electro-magnetic actuator according to the fifth embodiment of the present invention. A magnetic circuit 41 shown in FIGS. 15 and 16 has a stacking structure similar to that of the magnetic circuit shown in FIG. 9, in which a groove is formed in a side portion of a yoke 43a having a larger thickness than that of a yoke 43b, and a plate-like permanent magnet 48 is arranged in the groove. The surface of the S pole of the magnet 48 is fixed to the yoke 43a, and the surface of its N pole coincides with the side surface of the yoke 43a. Therefore, permanent magnets 44a, 44b, 45a, 45b, and 48 are arranged such that the magnetization direction of the magnets 44a, 44b, 45, and 45b becomes perpendicular to that of the magnet 48. Note that the N and S poles of the permanent magnet 48 can be inverted. Although the length in the longitudinal direction and the thickness of the magnet 48 are slightly smaller than those of the groove of the yoke 43a in this embodiment, they may be the same. In addition, although the width of the magnet 48 measured along the magnetized direction is set such that the N pole of the magnet 48 coincides with the side surface of the yoke 43a, it may slightly project from the side surface.

Figure 17A:
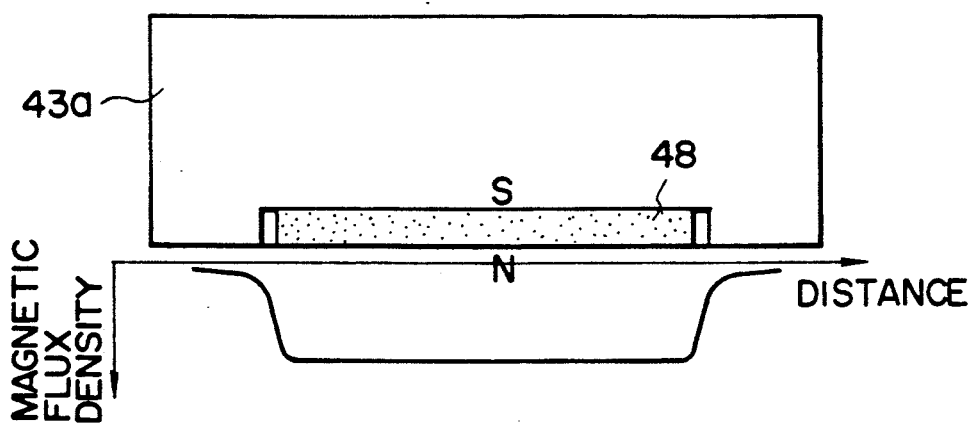
FIGS. 17A, 17B, and 17C are schematic views each showing a magnetic field distribution in the magnetic circuit shown in FIGS. 15 and 16.
Figure 17B:
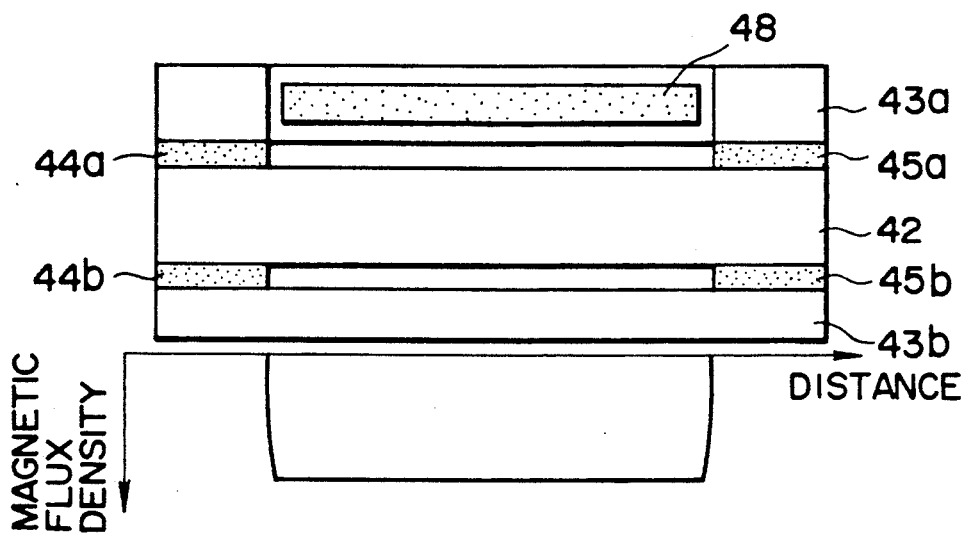
Figure 17C:
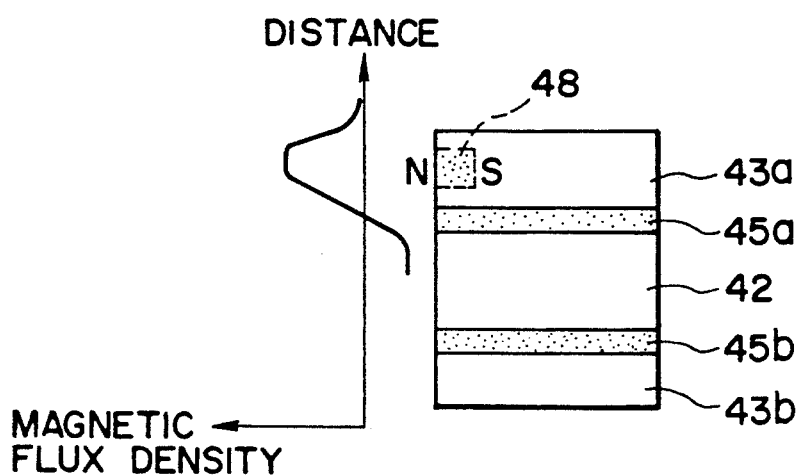

In the magnetic circuit 41 having the above structure, magnetic flux density distributions as shown in FIGS. 17A to 17C are generated. FIG. 17B shows a magnetic flux density distribution across the magnetic gap, and FIGS. 17A and 17C show a magnetic flux density distribution of the magnetization direction of the permanent magnet 48 along two perpendicular lines. In the magnetic circuit 41, magnetic fluxes generated by the N pole of the permanent magnet 48 form a magnetic path which passes through the yoke 43a and 42 and returns to the S pole of the magnet 48. Magnetic fluxes generated by the permanent magnet 48 effectively flow inside the magnetic circuit 41 without disturbing a flow of magnetic fluxes in the magnetic circuit 41 generated by the permanent magnets 44a, 44b, 45a, and 45b as in the magnetic circuit 1 shown in FIG. 6. Therefore, a movable member can be driven in two directions by using different flows of magnetic fluxes generated in the magnetic circuit 41.

Figure 18:
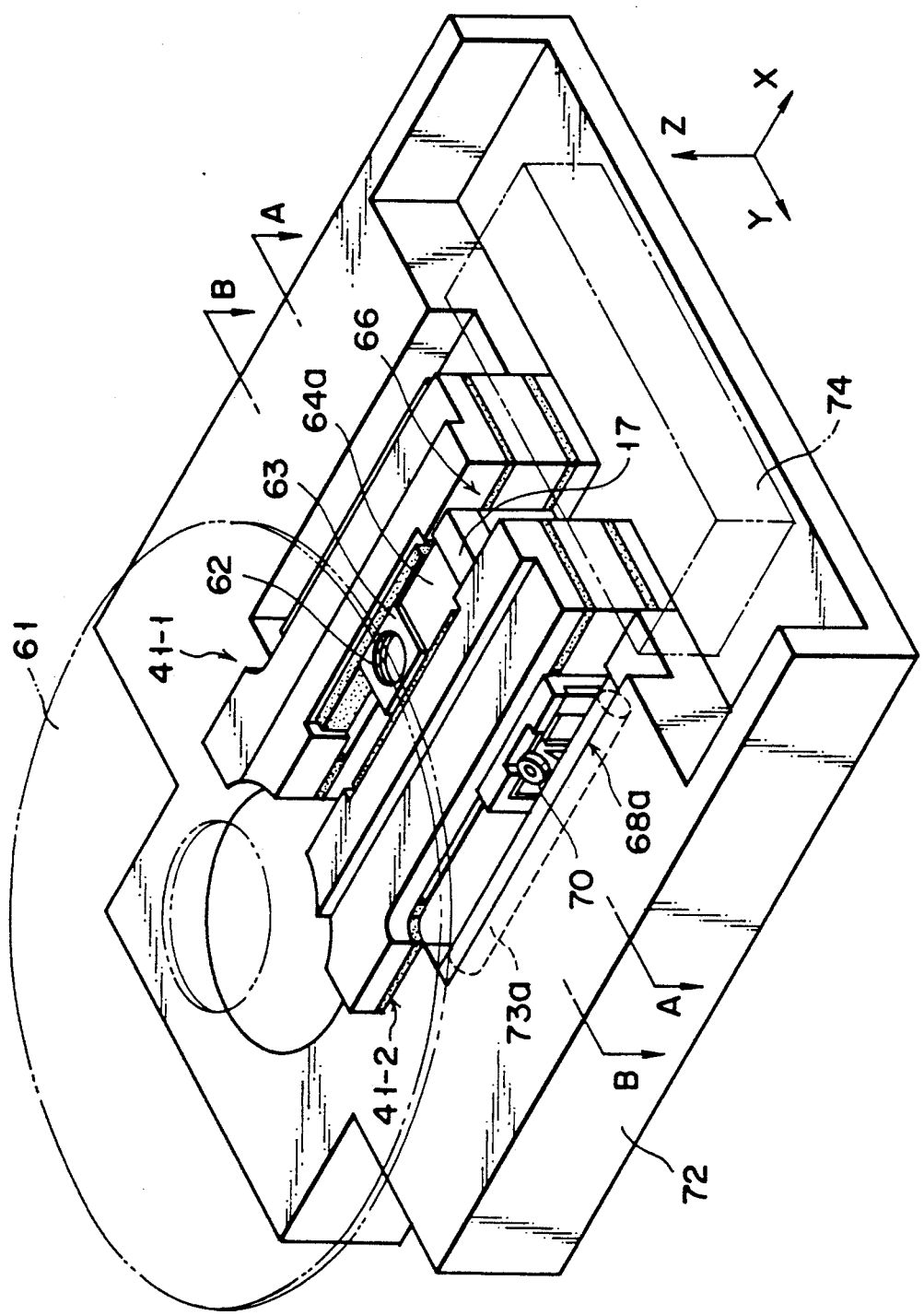
FIG. 18 is a perspective view schematically showing an optical disk apparatus incorporating the magnetic circuit shown in FIGS. 15 and 16.
Figure 19:
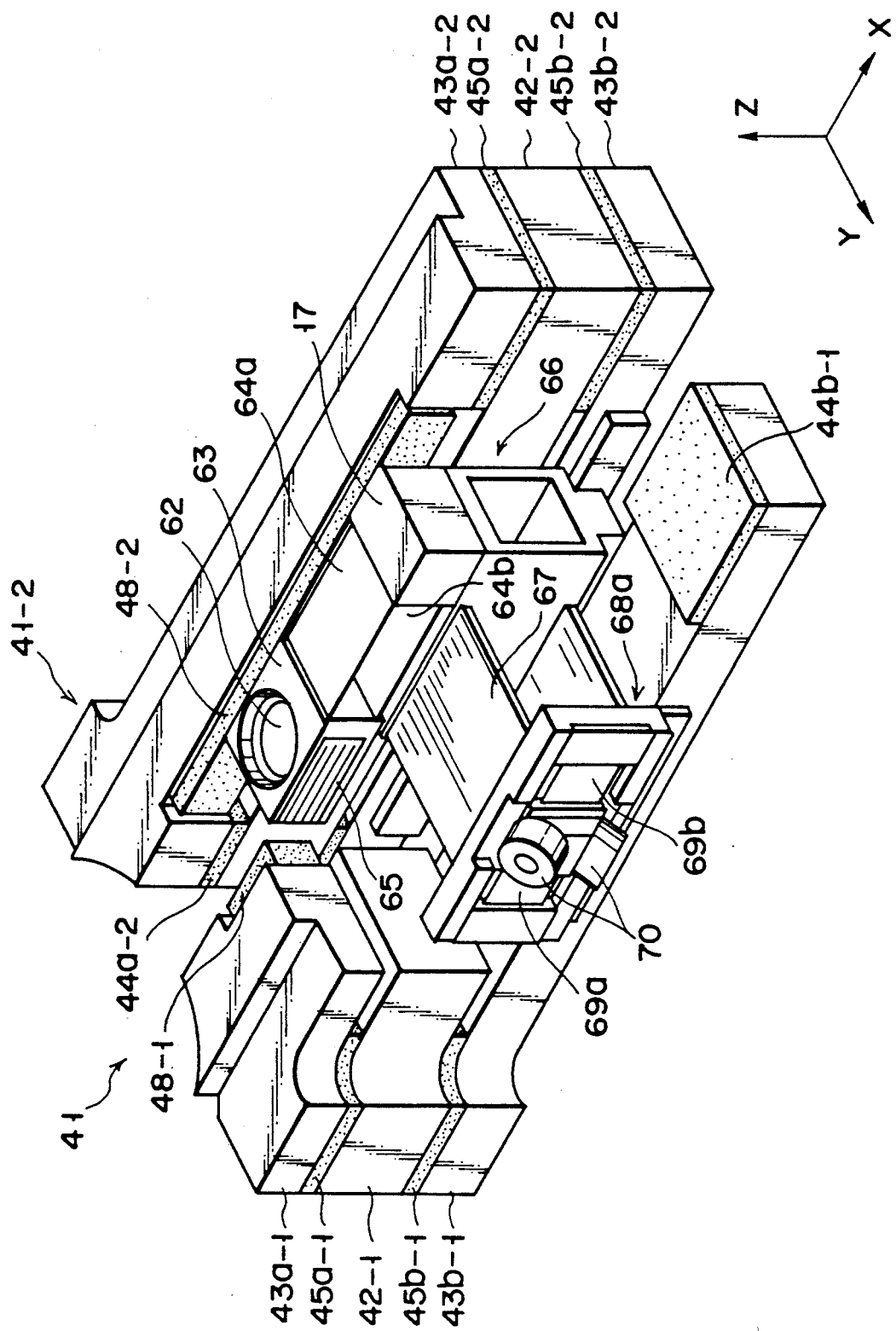
FIG. 19 is a perspective cutaway view schematically showing an actuator and a magnetic circuit for producing a magnetic field which causes the actuator to move.

An optical disk apparatus incorporating an electro-magnetic actuator using the magnetic circuit 41 shown in FIGS. 15 and 16 will be described below with reference to FIGS. 18 to 24. FIG. 18 shows a perspective inner structure of the optical disk apparatus, FIG. 19 shows a movable member and the magnetic circuit shown in FIG. 18, and FIG. 20 shows the movable member shown in FIGS. 18 and 19.

In order to optically read information from or optically write information in an optical disk 61 shown in FIG. 18, an objective lens 62 of an optical head is supported by a movable member 66 to oppose the optical disk 61. An optical system is arranged such that a light beam generated by a light source such as a semiconductor laser provided in a fixed optical system 74 outside the movable member 66 is guided to the objective lens 62 through a beam splitter or a reflecting mirror. This light beam is focused on a track of the optical disk 61 by the objective lens 62 to read information from or write information in the optical disk 61. The objective lens 62 is mounted on a lens holder 63, and one end face of the holder 63 is elastically supported by two leaf springs 64a and 64b. Therefore, the objective lens 62 is supported by the leaf springs 64a and 64b so that its optical axis coincides with the Z direction.

Figure 21:
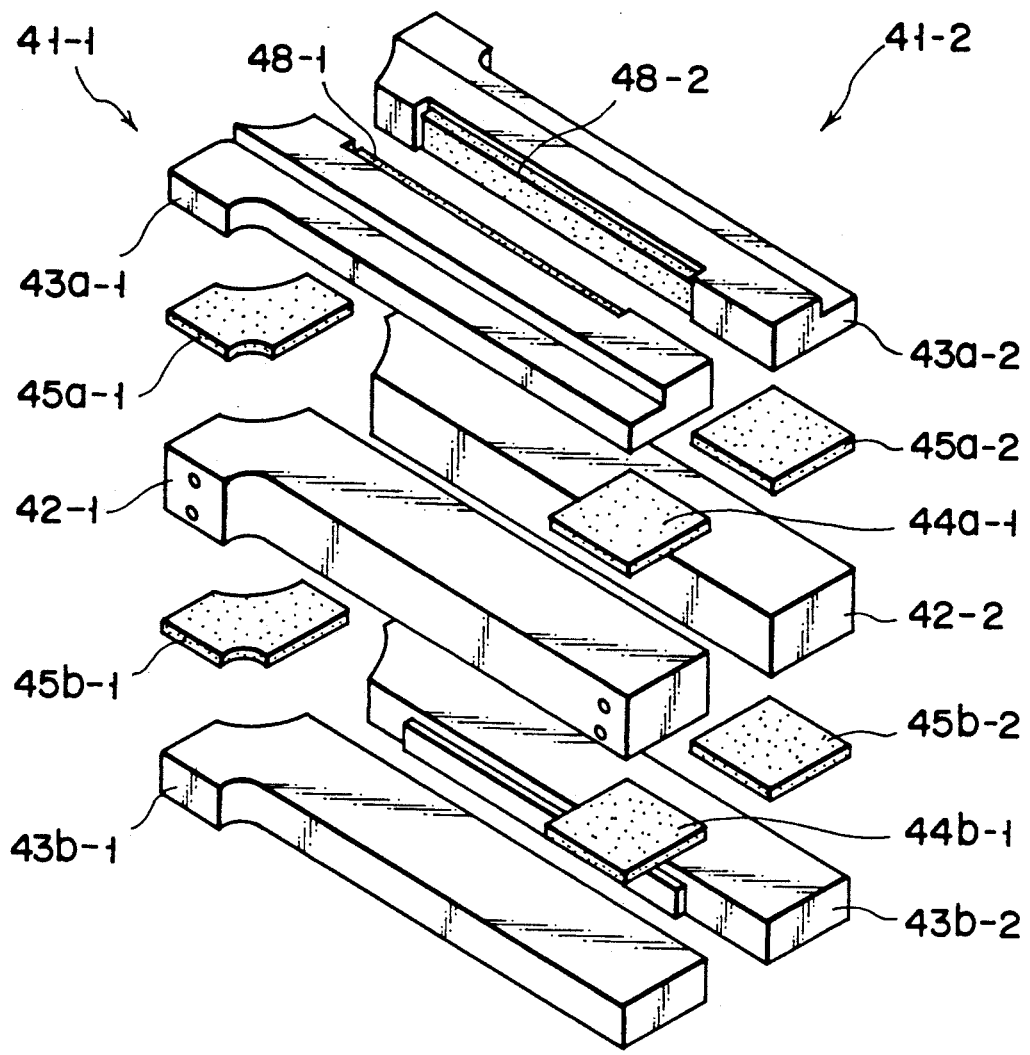
FIG. 21 is an exploded perspective view schematically showing a magnetic circuit shown in FIG. 19.

A focusing coil 65 having the Z direction as its axis is wound around the lens holder 63 so as to surround the objective lens 62 and forms a focusing electro-magnetic driving system together with magnetic circuits 41-1 and 41-2 as shown in FIGS. 21 and 23. Note that the objective lens 62, the lens holder 63, the focusing coil 65, and the like are mounted on the carriage 66 via the leaf spring 64a and 64b. The lens holder 63 and the carriage 66 consist of a resin material such as plastic.

Figure 20:
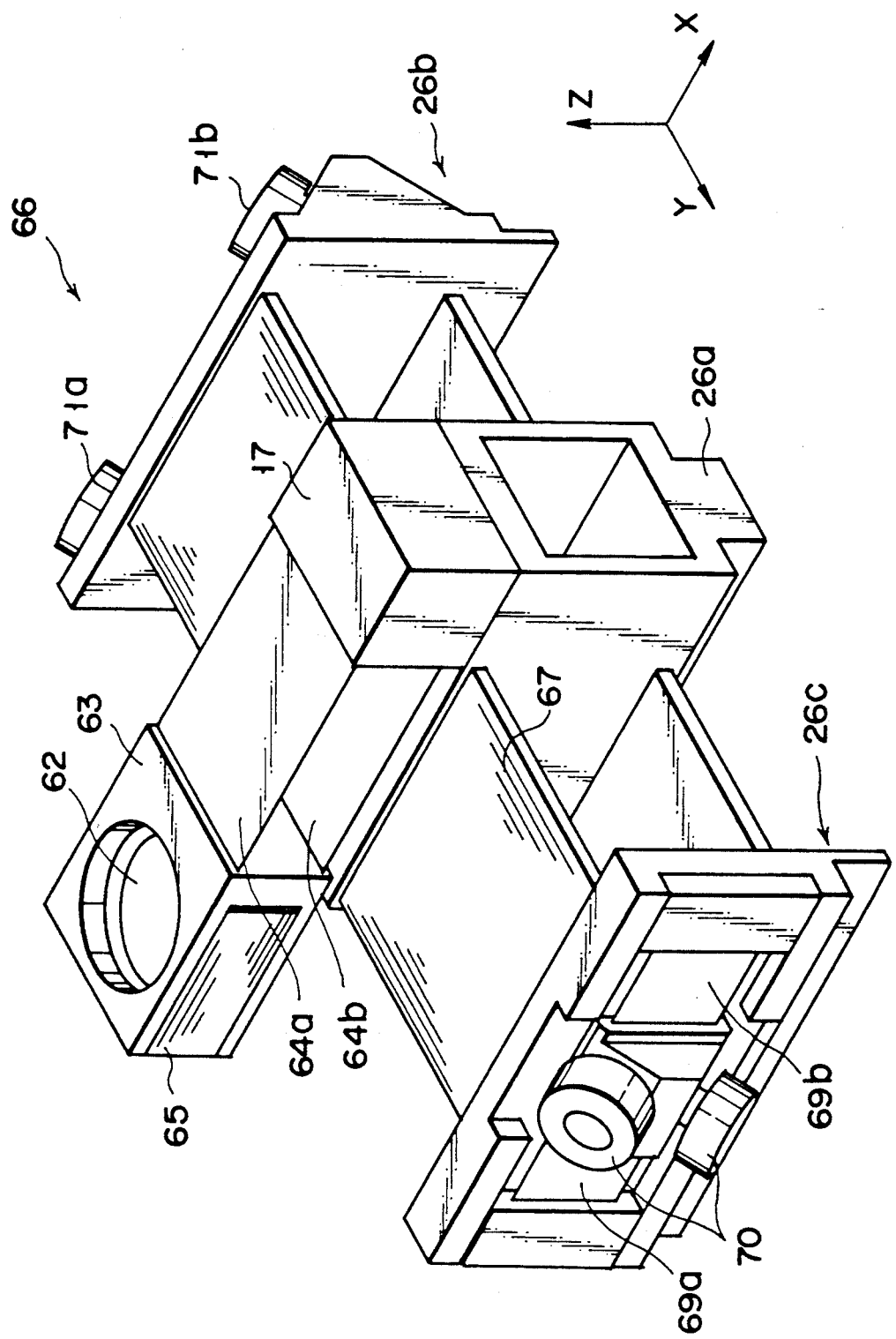
FIG. 20 is a perspective view showing the carriage shown in FIGS. 18 and 19.
Figure 22:
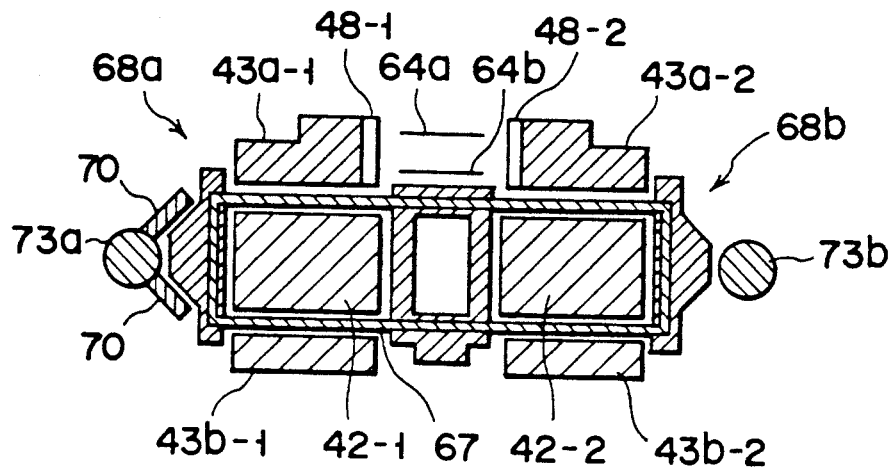
FIG. 22 is a sectional view taken along a line A—A of the optical disk apparatus shown in FIG. 18.

A tracking coil 67 wound around its axis along the X direction as shown in FIGS. 20 and 22 is fixed on the carriage 66, and guide roller mechanisms 68a and 68b are separately arranged along the Y direction and fixed at respective ends of the coil 67. The guide roller mechanism 68a has a pair of guide rollers 70 elastically supported by leaf springs 69a and 69b, and the guide roller mechanism 68b has a pair of guide rollers 71a and 71b fixed directly by the mechanism 68b. The guide rollers 70, 71a, and 71b have rotating axes inclined by 45° with respect to the Y direction and are in slidable contact with and roll along linear guides 73a and 73b with a circular section fixed to a base 72 and having a longitudinal direction in the X direction. Therefore, the two ends of the carriage 66 are supported by the linear guides 73a and 73b so that the carriage 66 can move in the X direction. Note that the tracking coil 67 forms a tracking electro-magnetic driving system together with the magnetic circuits 41-1 and 41-2.

The magnetic circuits 41-1 and 41-2 have basically the same structure as that shown in FIGS. 15 and 16 except that the shapes of the yoke and the permanent magnet are slightly different. Note that the magnetic circuits 41-1 and 41-2 are symmetrically arranged about the center of gravity of the carriage 66.

The tracking coil 67 fixed to the carriage 66 is wound to be inserted in four magnetic gaps formed by the magnetic circuits 41-1 and 41-2, and is supported by the linear guides 73a and 73b so as to be kept in a non-contact state with respect to yokes 42-1, 42-2, 43a-1, 43a-2, 43b-1, and 43b-2. In the actuator shown in FIGS. 18 and 19, the focusing coil 65 and permanent magnets 48-1 and 48-2 oppose each other via a gap. The length of each of the magnets 48-1 and 48-2 is sufficient to allow the magnet to oppose the carriage 66 throughout the entire movable distance.

An operation of the optical disk apparatus having the arrangement shown in FIG. 18 will be described below. In order to drive the objective lens 62 in the X direction, a current is flowed through the tracking coil 67. A Lorentz force, i.e., a driving force is generated in the X direction by a direction (Y direction) of the current and a direction (Z direction) of magnetic fluxes in magnetic gap of the magnetic circuit 41-1 and 41-2. Since a magnetic flux density in the magnetic gap is constant, a driving amount, a driving direction, and a driving speed are determined by controlling the current to be supplied to the tracking coil 67. The carriage 66 moves along the linear guides 73a and 73b elongated in the X direction while the guide rollers 70, 71a, and 71b roll on the linear guides in accordance with a driving force applied to the tracking coil 67. The objective lens 62 is roughly moved to a predetermined position in the radial direction of the optical disk 61 and then finely positioned thereat.

In order to drive the objective lens 62 in the Z direction, a current is flowed through the focusing coil 65, and a driving force is generated in the Z direction by a direction (X direction) of the current and a direction (Y direction) of magnetic fluxes of the permanent magnets 48-1 and 48-2. A driving amount, a driving direction, and a driving speed are similarly determined by controlling the current to be supplied to the focusing coil 65. The lens holder 63 is moved while equally curving the two leaf springs 64a and 64b in accordance with a driving force applied to the focusing coil 65. A spot of a light beam formed by the objective lens 62 is finely positioned at a predetermined position on the optical disk 61 and correctly focused thereon.

The current to be supplied to the focusing coil 65 is supplied via the leaf springs 64a and 64b, and terminals (to be described in detail later) provided at the other ends of the springs 64a and 64b and projecting from the carriage 66 are connected to a power source.

In the above optical disk apparatus, since a magnetic flux density distribution in the magnetic gap is uniform along the inner surface of the yoke upon driving of the objective lens 62 in the X direction, a constant driving force can be obtained in the magnetic gap. In a conventional magnetic circuit, a magnetic flux density is largely decreased at both ends of the magnetic gap. In the magnetic circuits 41-1 and 41-2 shown in FIGS. 18 and 19, however, a magnetic flux density is not largely decreased even at both ends of the magnetic gap, and a stable driving force can be obtained at the central portion or both the end portions of the magnetic gap. Therefore, power supply control with respect to the tracking coil 67 need not be changed regardless of the position of the carriage 66, resulting in very simple control. In addition, even if the magnetic circuits 41-1 and 41-2 are made compact in size as a whole or a magnetomotive force of the permanent magnet is increased to exceed a saturated magnetic flux density of the yoke, a magnetic flux density to be applied to the tracking coil 67 is substantially uniform along the inner surface of the magnetic gap. Therefore, a substantially constant driving force is generated regardless of the position of the carriage 66.

The permanent magnet 48 provided to apply a magnetic force to the focusing coil 65 applies magnetic fluxes to also the tracking coil 67. If the magnet 48 is mounted in the same direction as that of a flow of magnetic fluxes in the magnetic gap as shown in FIG. 24B, a magnetic flux density distribution as indicated by a curve I in FIG. 24B is obtained to allow the driving force to be generated at a portion near the center of the carriage 66. Therefore, in a structure in which the weight of the entire carriage 66 is relatively concentrated in a portion near its center, the magnetic flux density distribution indicated by the curve I is preferred. When the magnetization direction of the permanent magnet 48 is fixed to be opposite to that shown in FIG. 24A, a magnetic flux density distribution in the magnetic gap is increased to be a magnetic flux density distribution as indicated by a curve II in FIG. 24B. Therefore, in a structure in which the weight of the entire carriage 66 is relatively concentrated in a portion near its terminal end portion, i.e., a portion near the guide rollers 73a and 73b, the magnetic flux density distribution indicated by the curve II is preferred.

FIGS. 25 and 26 show a magnetic circuit of an electro-magnetic actuator according to the sixth embodiment of the present invention. In a magnetic circuit 51 shown in FIGS. 25 and 26, instead of the permanent magnet 48 shown in FIGS. 15 and 16, a permanent magnet 58 is arranged in a groove of a yoke 52 and fixed to the yoke 52. The length in the longitudinal direction of the magnet 58 is slightly smaller than the length of the groove of the yoke 52, and the thickness of the magnet 58 is set equal to the thickness of the yoke 52. However, the dimensions are not limited to those in this embodiment.

Figure 27A:
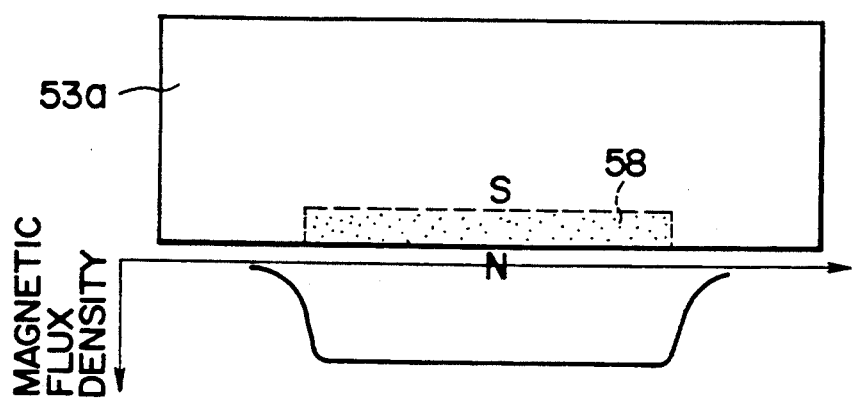
FIGS. 27A, 27B, and 27C are schematic views each showing a magnetic flux distribution in the magnetic circuit shown in FIGS. 25 and 26.
Figure 27B:
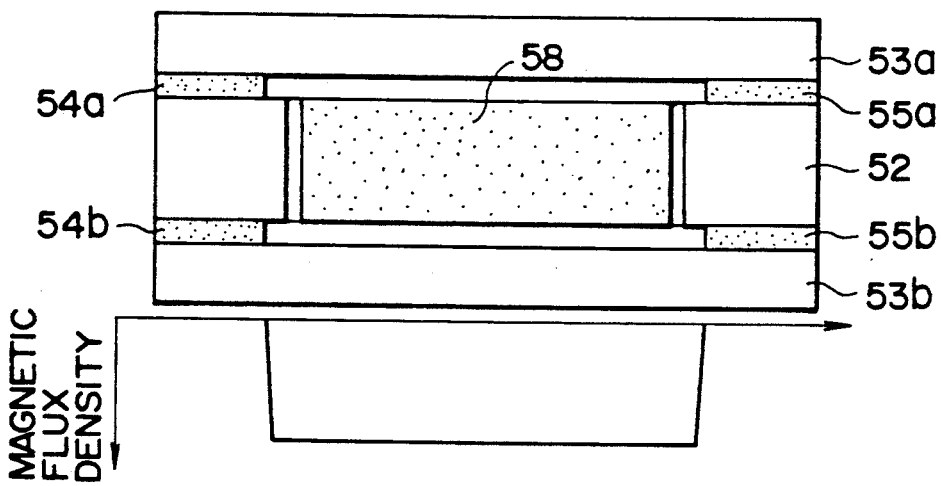
Figure 27C:
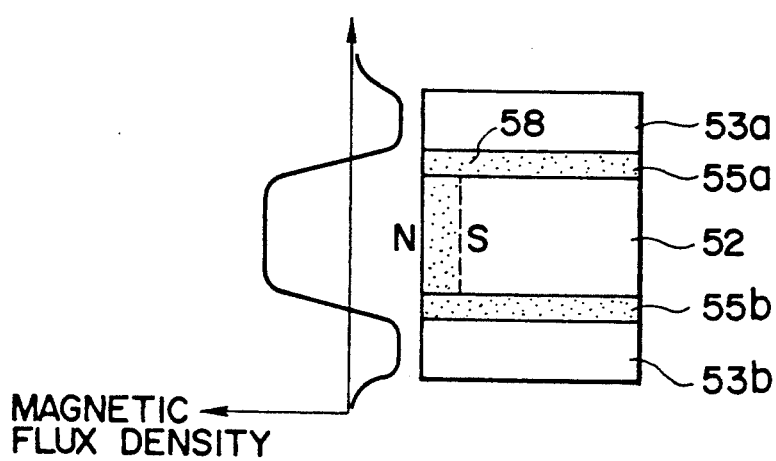

In the magnetic circuit 51 having the above structure, magnetic flux density distributions shown in FIGS. 27A, 27B, and 27C are generated. FIG. 27B shows a magnetic flux density distribution of a magnetic gap along the magnetic gap, and FIGS. 27A and 27C show a magnetic flux density distribution along the magnetization direction of the permanent magnet 58 and a magnetic flux density distribution along a direction perpendicular to the magnetization direction.

In the magnetic circuit shown in FIGS. 25 and 26, since magnetic fluxes generated by the N pole of the permanent magnetic 58 return to upper and lower yokes 53a and 53b, a reluctance can be reduced in comparison with a magnetic path passing through a space around the magnetic circuit. As a result, a magnetic flux density on the end face of the magnetic pose can be further increased.

Figure 28:
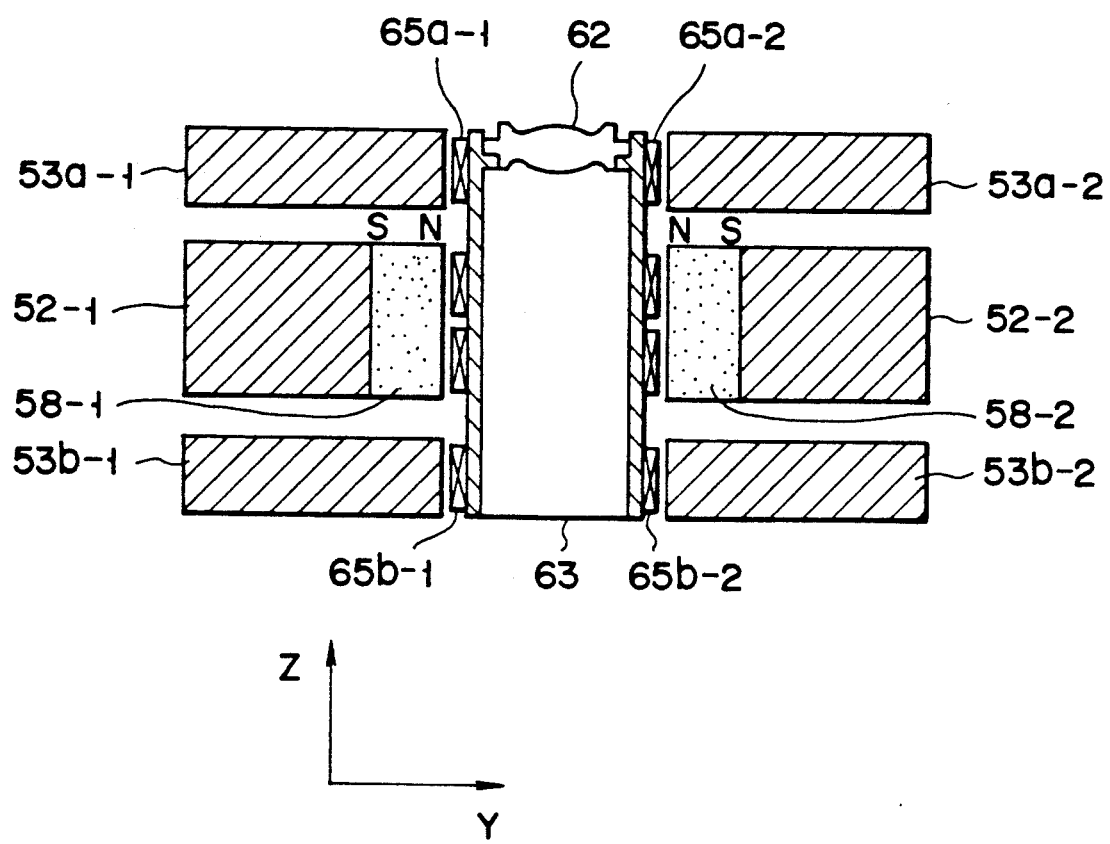
FIG. 28 is a sectional view showing a part of an actuator incorporating the magnetic circuit shown in FIGS. 25 and 26.
Figure 29:
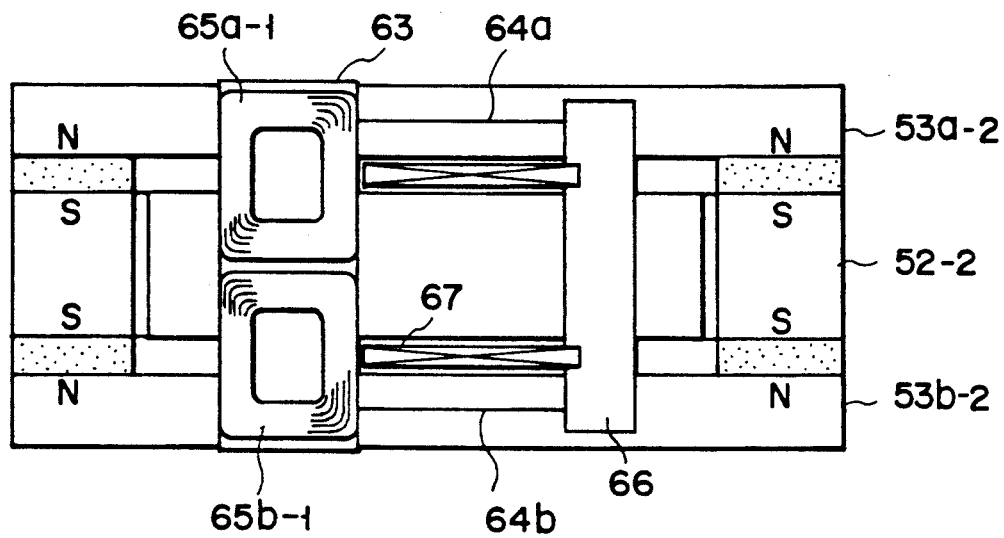
FIG. 29 is a sectional view showing another part of the actuator incorporating the magnetic circuit shown in FIGS. 25 and 26.

When the electro-magnetic actuator including the above magnetic circuit 51 is to be incorporated in an optical disk apparatus, the magnetic circuit 51, the carriage 66 and the lens holder 63 are arranged as shown in FIGS. 28 and 29. FIG. 28 shows the same portion as in the sectional view of the actuator taken along the line B—B in the above embodiment shown in FIG. 23, and FIG. 29 is a sectional view of the actuator in an XZ plane including the center of the carriage 66. In order to effectively use magnetic fluxes generated by permanent magnets 58-1 and 58-2, two pairs of four flat focusing coils 65a-1, 65a-2, 65b-1, and 65b-2 wound to have the Y direction as their axes are fixed to side surface of the lens holder 63 in positions at the carriage 66 side opposing the magnets 58-1 and 58-2. Two leaf springs 64a and 64b are arranged to sandwich a tracking coil 67 with an equal distance therefrom and elastically support a lens holder 63. Other arrangements are the same as those of the optical disk apparatus as described above. In this embodiment, since a magnetic flux density distribution in a magnetic gap is uniform along the inner surface of the yoke upon driving of an objective lens 62 in the X direction, a constant driving force can be obtained in the magnetic gap.

Figure 24A:
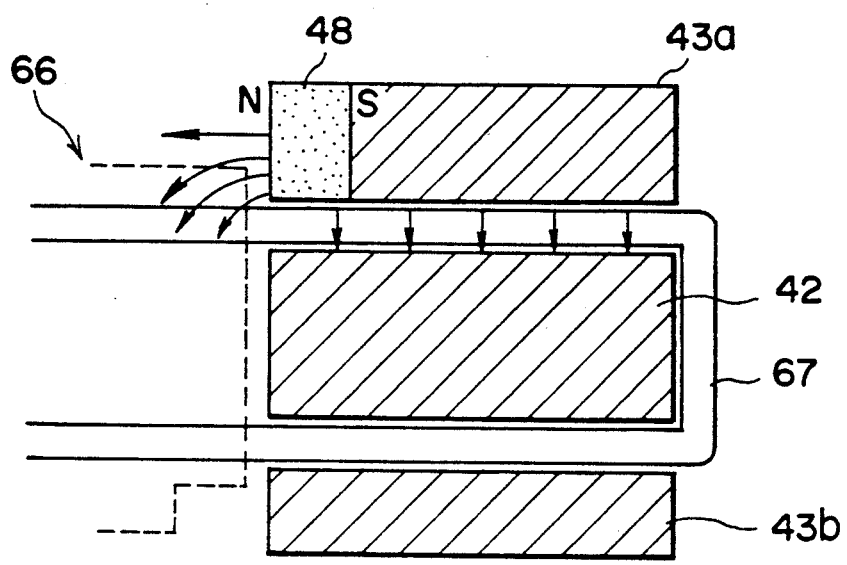
FIG. 24A is a partial sectional view showing a magnetic path of the actuator shown in FIG. 19.
Figure 24B:
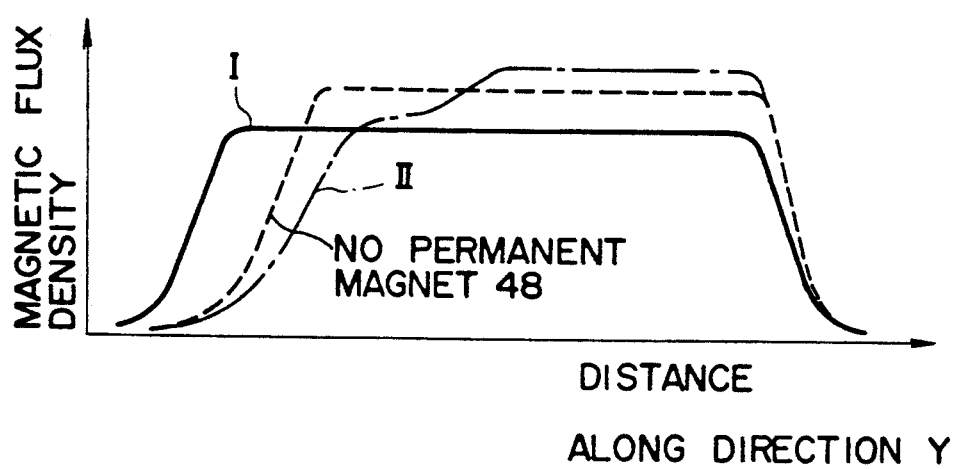
FIG. 24B is a graph showing a magnetic flux distribution in a magnetic circuit shown in FIG. 24A.

In the magnetic circuit shown in FIGS. 25 and 26, by fixing the magnetic pole of the permanent magnet 58 in an opposite direction as shown in FIG. 24A, the magnitude of a magnetic force to be applied to the tracking coil 67 can be changed.

In the fifth and sixth embodiments, a flow or distribution of magnetic fluxes can be adjusted by providing an additional permanent magnet to the magnetic circuits 41 and 51. In addition, the same effect can be obtained by providing an additional permanent magnet to the magnetic circuits 1, 11, 21, and 31 according to the first to fourth embodiments. Although a description is omitted, the magnetic circuits 1, 11, 21, and 31 of the first to fourth embodiments can be used to drive an optical head or the like.

Figure 30:
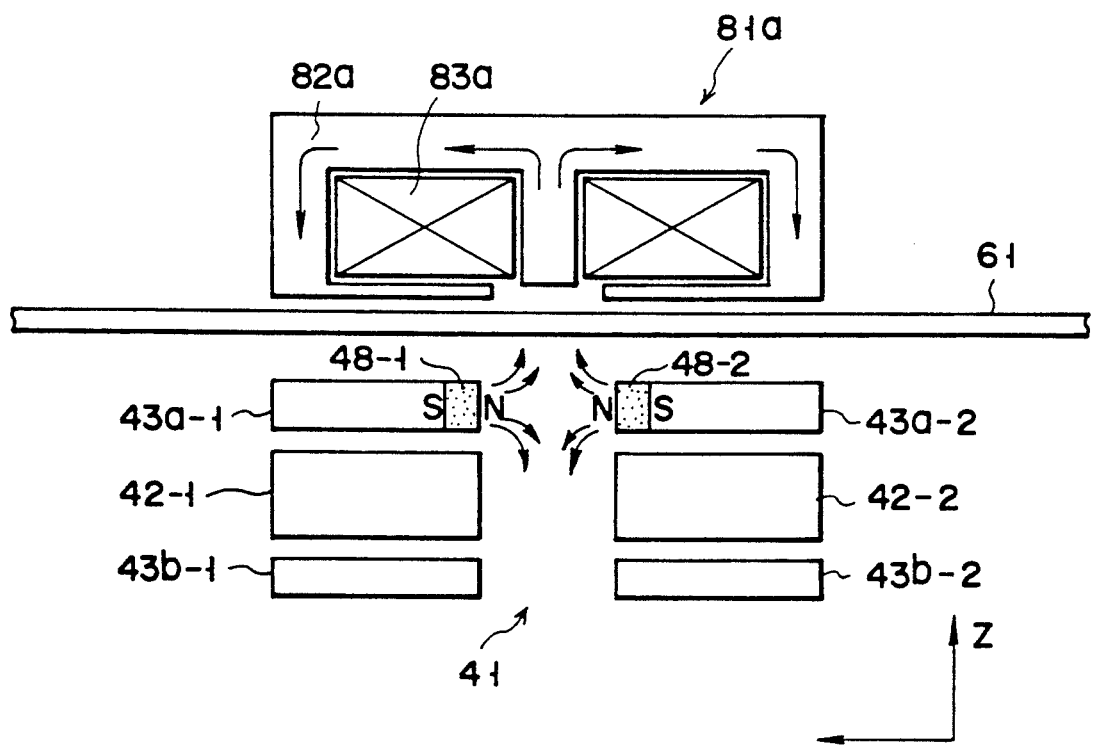
FIGS. 30, 31, and 32 are schematic views each for explaining an influence caused when a magnetic circuit of the present invention is applied to an opto-magnetic recording apparatus.

An influence of a magnetic field caused by the magnetic circuit of the present invention on an optical disk will be described below with reference to FIGS. 30 to 32. As shown in FIG. 30, in an opto-magnetic recording/reproduction apparatus, an auxiliary magnetic field generating device 81a is provided to oppose the magnetic circuit via an opto-magnetic disk 61 and applies a magnetic field to the disk 61. In general, in order to perform both recording and reproduction of information in an opto-magnetic recording/reproduction apparatus, the intensity of a light beam to be radiated onto an optical disk must be maintained constant to keep a magnetic moment in one direction on a recording surface of the opto-magnetic disk. For this purpose, a bias magnetic field must be applied to the surface of the opto-magnetic disk. In order to maintain the magnetic moment constant, opposite bias magnetic fields must be used in recording and reproduction of information. An auxiliary magnetic field generating device 81a as an electromagnet is provided to invert the magnetic poles. The device 81a has a yoke 82a and a coil 83a and forms a flow of magnetic fluxes as indicated by an arrow in FIG. 30, thereby recording information. The device 81a reverses the direction of a current to be supplied to the coil 83a to form a flow of magnetic fluxes opposite to that shown in FIG. 30, thereby reproducing information.

In the above arrangement the magnetic flux flow from the permanent magnet 48 reaches the surface of the opto-magnetic disk 61 to supply a magnetic field in the Z direction. Therefore, magnetic fluxes of the permanent magnet 48 contribute to (1) focusing coil driving, (2), tracking coil driving, and (3) magnetic field supply to the surface of the opto-magnetic disk. By the effect of item (3), a magnetic force (i.e., an amount of a current to be supplied to the coil 83) generated by the auxiliary magnetic field generating device 81a can be suppressed.

Figure 31:
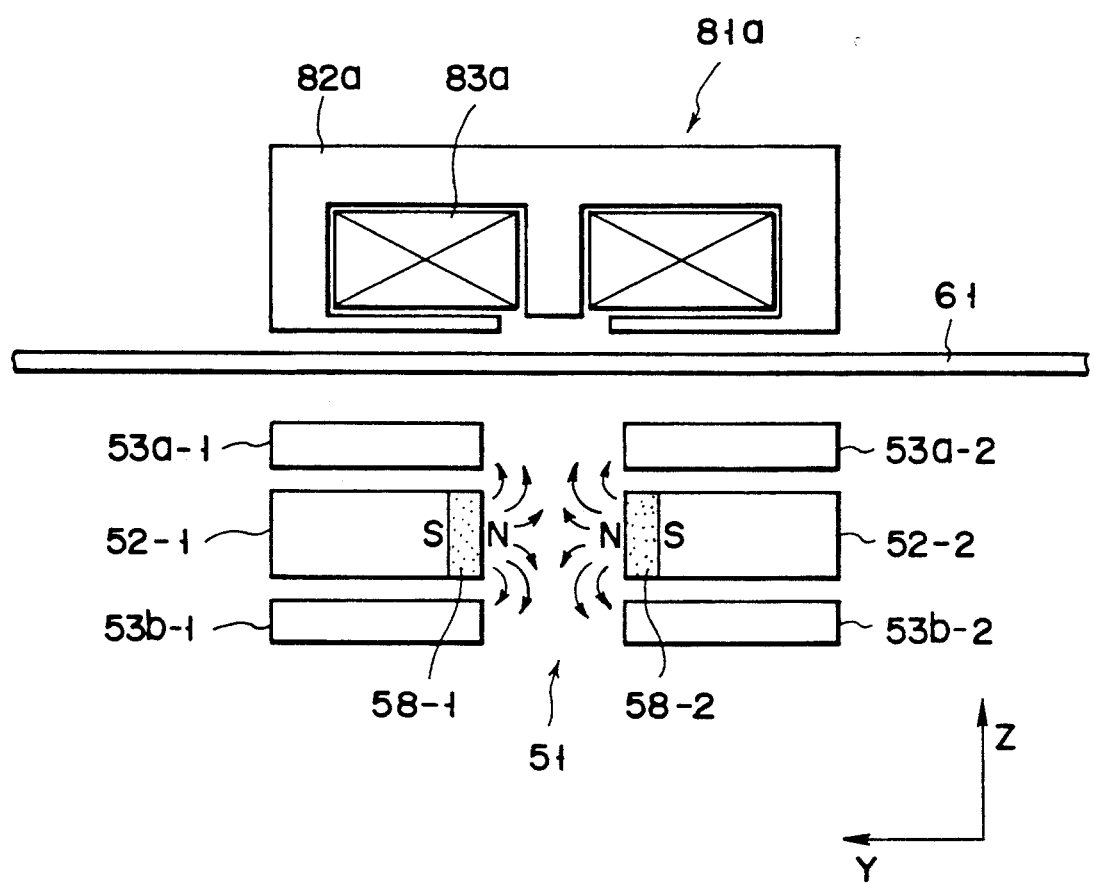

FIG. 31 is a sectional view showing an influence of a magnetic field on an opto-magnetic disk obtained when the magnetic circuit 51 is used. Note that other arrangements are the same as shown in FIGS. 28 and 29. In this embodiment, most of magnetic fluxes from the permanent magnet 58 are absorbed by yokes 53a and 53b, and almost no magnetic fluxes reach the surface of an opto-magnetic disk 61. Therefore, when recording, reproduction, and erasure of information is realized by modulation of an auxiliary magnetic field intensity on the recording surface of the disk 61, an operation is not influenced by the magnetic circuit for driving an actuator. As a result, a bias magnetic field corresponding to a current amount to be flowed to the coil 83b of the auxiliary magnetic field generating device 81b can be generated.

Figure 32:
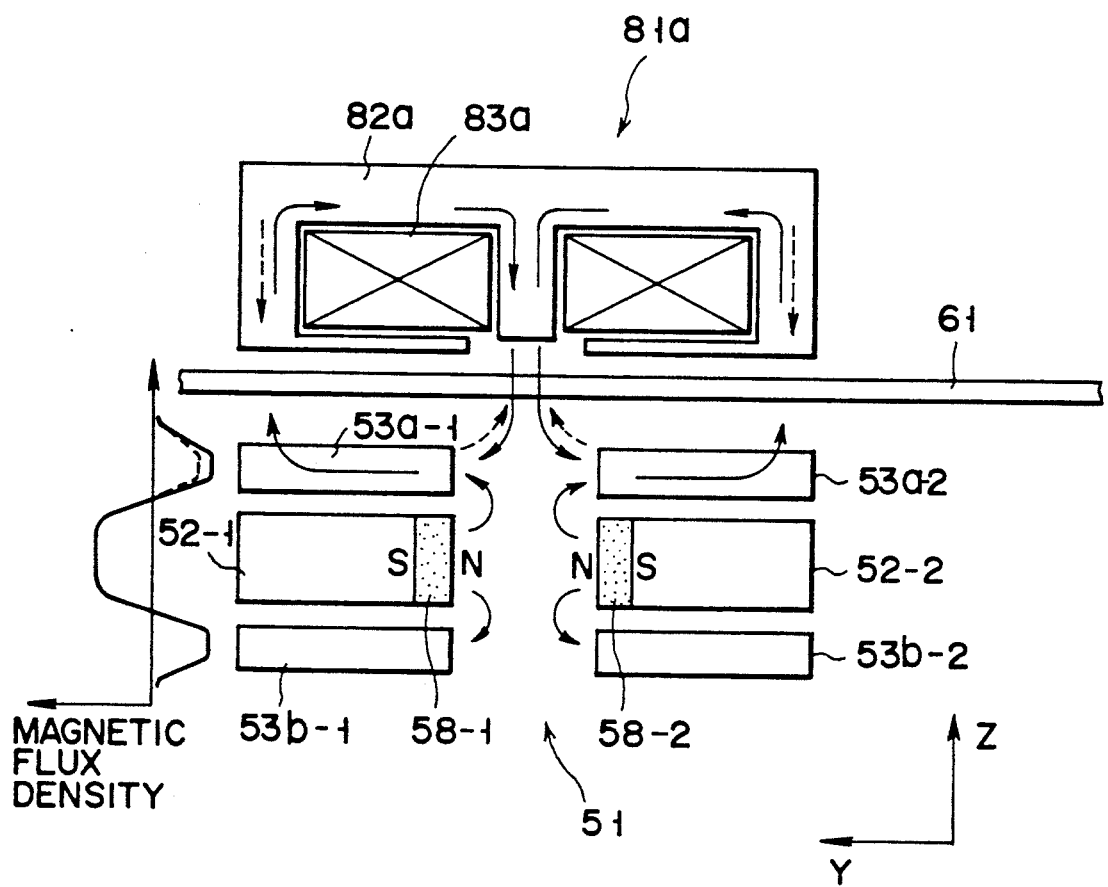

As shown in FIG. 32, magnetic fluxes generated by the device 81a form an effective magnetic path flowing through the yoke 53a of the magnetic circuit 51. For this reason, an amount of magnetic fluxes which flow on the recording surface of the opto-magnetic disk 61 and return to the yoke 81b after passing through the yoke 53a is increased. Therefore, a passing magnetic flux density on the recording surface of the disk 61 with respect to the current amount to be supplied to the coil 83b is further increased to suppress an amount of unnecessary magnetic fluxes which leak into air.

When the direction of a current to be supplied to the coil 83b is reversed, magnetic fluxes generated by the auxiliary magnetic field generating device 81a and passing through the yokes 53a-1 and 53a-2 vary magnetic fluxes for driving the focusing coils 65a-1 and 65a-2. In general, however, an amount of magnetic fluxes generated by the device 81a is smaller than that of magnetic fluxes generated by the magnetic circuit 51. That is, an amount of magnetic fluxes to be supplied to the recording surface of an opto-magnetic disk is smaller than that of magnetic fluxes for focus driving. For this reason, when the direction of magnetic fluxes of the auxiliary magnetic field generating device 81a is reversed with respect a magnetic flux density distribution curve as indicated by a solid line in FIG. 32, a magnetic flux density distribution only slightly changes as indicated by a broken line, and a driving force does not change much. Therefore, even if the direction of magnetic fluxes is reversed, almost no variation is caused in magnetic fluxes in a magnetic flux density distribution to be given to the focusing coils 65a-1 and 65a-2, and a stable driving force is constantly supplied to the coils 65a-1 and 65a-2.

The structure and parts of the optical disk apparatus shown in FIG. 18 will be described in more detail below with reference to FIGS. 33 to 53.

Figure 33:
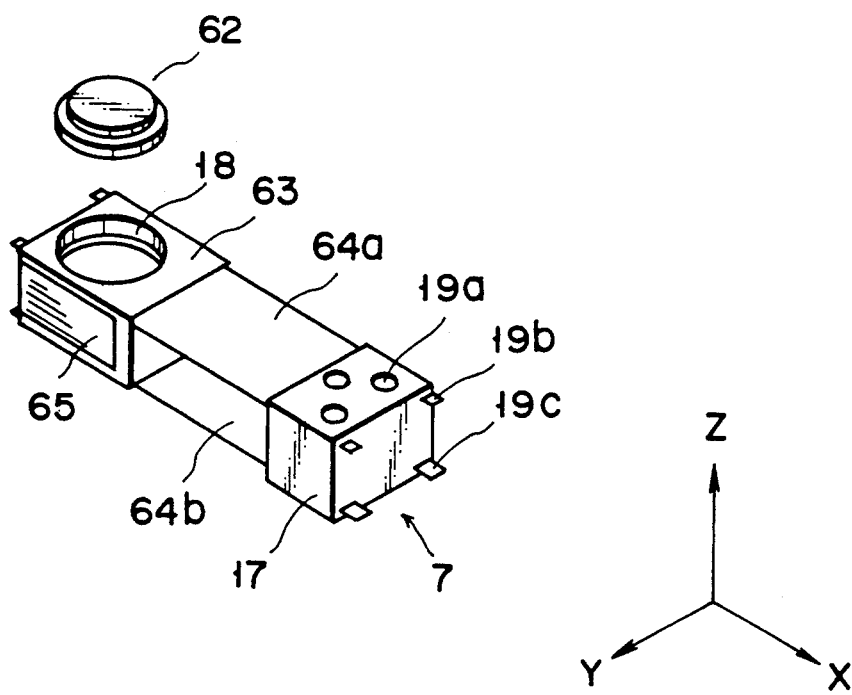
FIG. 33 is a perspective view showing an upper structure of the carriage shown in FIG. 20.
Figure 34:
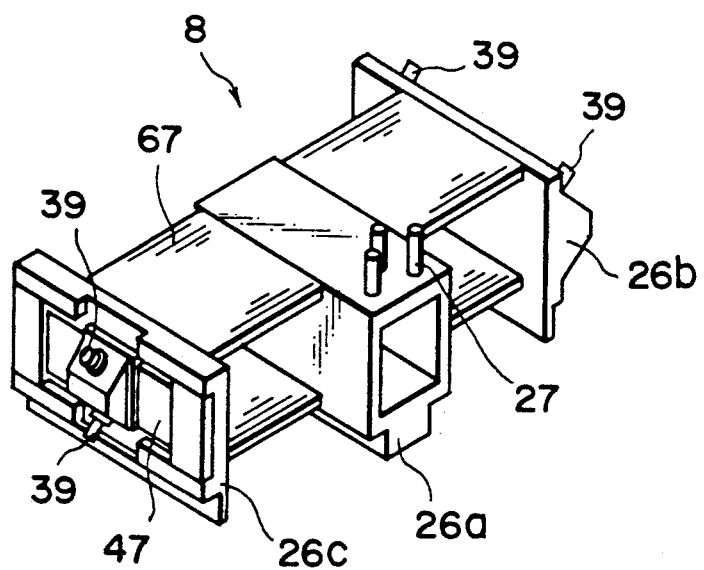
FIG. 34 is a perspective view showing a lower structure of the carriage shown in FIG. 20.

The movable member shown in FIG. 20, i.e., the carriage 66 is constituted by an upper structure shown in FIG. 33 and a lower structure 8 shown in FIG. 34. As described above, the upper structure 7 has a function as a focus actuator for moving an objective lens 62 along its optical axis. The upper structure 7 comprises a lens holder 63, a focusing coil 65 wound to have the Z direction as its axis, two parallel leaf springs 64a and 64b for elastically supporting the lens holder 63, and a focus actuator fixing section 17 for fixing the other ends of the springs 64a and 64b.

The lens holder 63 is formed by molding, e.g., injection molding from a resin material and has a ring-like snap 18 for fixing the objective lens 62 by fastening as shown in FIG. 33. The snap 18 may be molded integrally with or independently from the lens holder 63. Alternatively, a flange portion of the objective lens 62 may be adhered and fixed to the lens holder 63 without using the snap 18. The focus actuator fixing section 17 is formed by molding from a resin material to have attachment holes 19a to be connected to the lower structure 8 (to be described later).

The parallel leaf springs 64a and 64b for connecting the lens holder 63 and the focus actuator fixing section 17 consist of a conductive material. Terminal end portions of the springs 64a and 64b are fixed to the focus actuator fixing section 17 and the lens holder 63, and their end portions 19b and 19c are exposed from the fixing section 17 in order to supply a current to the focusing coil 65. That is, the parallel leaf springs 64a and 64b also serve as power supply members for supplying a current to the focusing coil 65. Wirings of the focusing coil 65 and the tracking coil 67 will be described in detail later.

FIG. 34 shows the lower structure 8 of the optical head apparatus. In the structure 8, the tracking coil 67 is fixed integrally with a carriage molded by using a resin material and constituted by carriage sections 26a, 26b, and 26c. The guide rollers 70, 71a, and 71b such as three pairs of six bearings are provided on both side surfaces of the lower structure 8. Note that although the tracking coil 67 is molded as a single coil connecting the carriage sections 26b and 26c in this embodiment, different coils may be provided between the carriage sections 26a and 26b and between the carriage sections 26b and 26c. Alternatively, as shown in FIG. 33, a resin part for reinforcing the tracking coil 67 for connecting the section 26a to the sections 26b and 26c may be provided to the coil 67 so that the section 26a is not connected to the sections 26b and 26c by only the coil 67. In addition, the number of bearings is not limited to three pairs of six bearings as shown in FIG. 20.

The central carriage section 26a for increasing the rigidity of the tracking coil 67 is molded to be hollow, and a light beam passes through inside the section 26a. That is, a guiding optical system and a detecting optical system at a fixed side are optically connected to a disk via a reflecting mirror 29 fixed to the carriage 66 below the objective lens 62. Attachment pins 27 to be fitted in the attachment holes 19a of the focus actuator fixing section 17 are formed integrally with the upper surface of the central carriage section 26a. The section 26a and the attachment portion of the section 17 are shown in detail in FIG. 35. As shown in FIG. 35, when each pin 27 is inserted in a corresponding one of the holes 19a, a predetermined gap is formed between the two members. In addition, a small amount of adhesive 28 is present between bonding surfaces of the section 26a and 17. According to such an attaching method, inclination adjustment for setting the optical axis of the objective lens 62 to be perpendicular to the disk surface can be easily performed. That is, upon attachment of the carriage 66 and the focus actuator fixing section 17, the inclination of the lens 62 can be adjusted by the section 17 which can be easily operated, resulting in the following advantage.

Figure 36A:
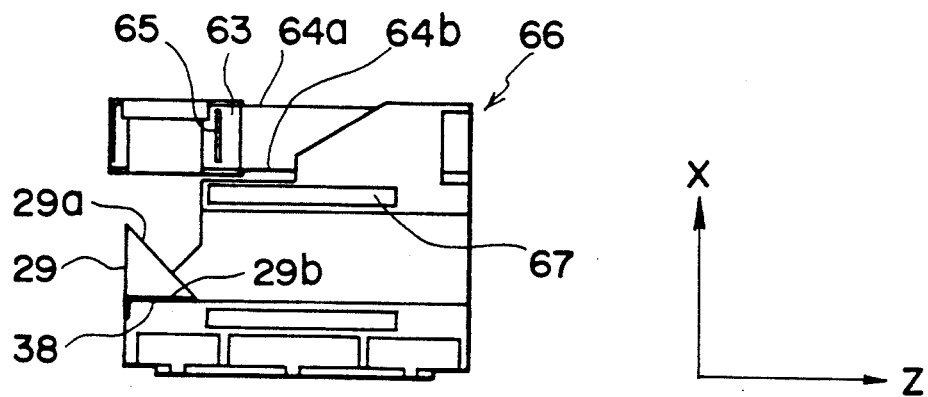
FIGS. 36A and 36B are sectional views showing a part of the lower structure of the carriage shown in FIG. 34.
Figure 36B:
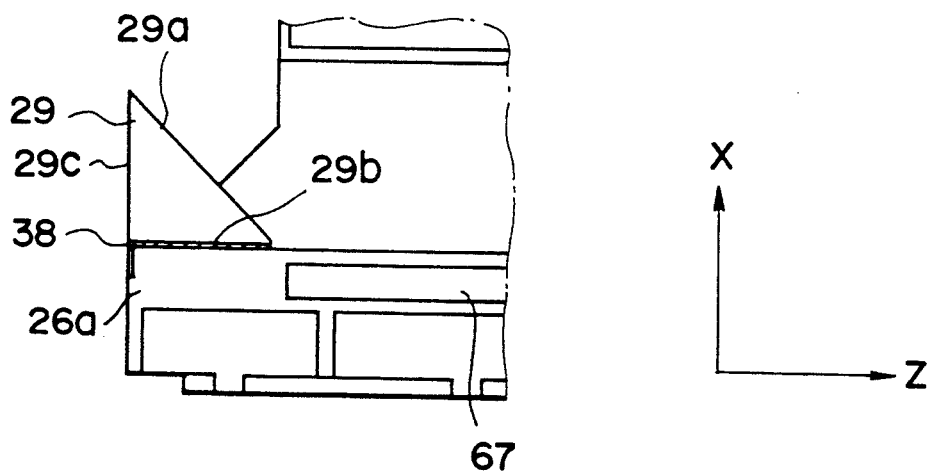

It is difficult to adjust the inclination of the objective lens 62 when the lens 62 is to be fixed to the lens holder 63 since a space between the objective lens 62 and the lens holder 63 is narrow. Therefore, easy adjustment of the inclination of the lens 6 performed by using the focus actuator fixing section 17 contributes to an improvement in productivity of the optical head apparatus. The inclination of the reflecting mirror 29 can also be easily adjusted. FIG. 36A shows a positional relationship between the carriage 66 and the mirror 29, and FIG. 36B shows a connecting portion between the two members. The triangular-prism reflecting mirror 29 is fixed to a mirror attachment surface of the central carriage section 26a via the adhesive 38. If the reflecting mirror 29 is directly adhered on the mirror attachment surface without performing positional adjustment, the mirror 29 cannot be fixed with a predetermined inclination with respect to the optical axis due to variations in assembly precision of the carriage 66 or parts precision thereof or the like. Therefore, the adhesive 38 is interposed in an attachment gap and the inclination of the mirror 29 is adjusted in a predetermined direction before the adhesive 38 is hardened, thereby facilitating inclination adjustment. As a result, stable optical characteristics of the reflecting mirror 29 are realized. In order to adjust the predetermined position and inclination of the mirror 29, any of rectangular surfaces except for a reflecting surface 29a and an adhesion surface 29b and triangular surfaces of the triangular prism, e.g., a rectangular surface 29c in this embodiment shown in FIG. 36B is a non-adhesion surface serving as a chucking surface for holding the mirror 29 upon adhesion. Although not shown, the reflecting mirror 29 may be connected to another member in advance and this member may be adhered to the carriage 66 so that the reflecting surface is adjusted to have a predetermined inclination.

The two side carriage sections 26b and 26c will be described below with reference to FIGS. 37 and 38. Two pairs of four pins 39 for attaching the two pairs of four guide rollers 70, 71a, and 71b by adhesion or fitting are molded integrally with the side carriage section 26b.

The axial directions of the upper and lower pairs of pins 39 are substantially perpendicular to each other, and the pins 39 are positioned beforehand upon molding such that the rotating shafts of the guide rollers 70, 71a, and 71b are set to be substantially perpendicular to the direction of the linear guides. This positioning is similarly performed for the other pins 39 by using a suitable jig upon molding of the section 26b.

The inclination of the carriage 66 with respect to the linear guides 73a and 73b is determined by a contact state of the guide rollers 70, 71a, and 71b with respect to the linear guides 73a and 73b. Therefore, a molding material is injected to fix the pins 39 which are positioned with respect to metal molds, thereby improving position accuracy between a plurality of pins and inclination accuracy of the carriage 66. Similarly, a relative position between the tracking coil 67 and the pins 39 can be determined by injecting a molding material to fix the tracking coil 67 which are positioned with respect to metal molds. Satisfactory precision in assembly of the carriage can be assured by keeping the precision of the metal molds.

Figure 37:
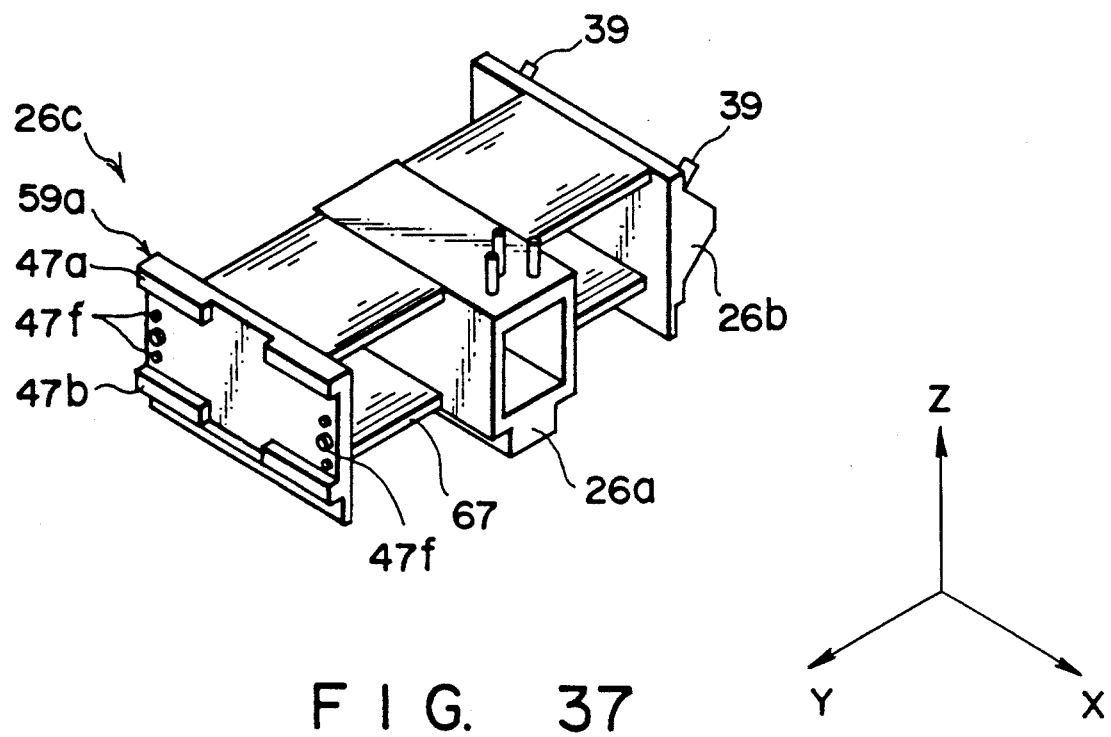
FIGS. 37 and 38 are perspective views showing parts of the lower structure of the carriage shown in FIG. 34.
Figure 38:
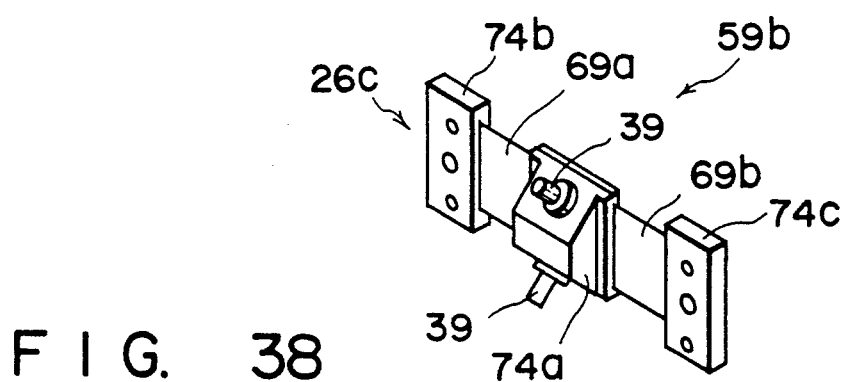

As shown in FIGS. 37 and 38, the side carriage section 26c is constituted by a fixed part 59a to which the tracking coil 67 is fixed and a deformation part 59b, fixed on the fixed part 59a, for absorbing a reaction force applied on the guide rollers 71a and 71b when the rollers 71a and 71b are placed on the linear guides 73a and 73b. That is, in this deformation part 59, the two guide rollers 70, 71a, and 71b are elastically supported at their two ends by the leaf springs 69a and 69b to form a symmetrical beam structure. Therefore, when the guide rollers 70, 71a, and 71b receive a reaction force from the linear guides 73a and 73b, the pins 39 are displaced in the Y direction without being inclined. The outer side surface of the fixed part 59a is formed to have a U-shaped section, and its upper and lower projections form positioning guides 47a and 47b. Positioning pins 47f are formed integrally with the carriage section 26c between the upper and lower positioning guides 47a and 47b. In the deformation part 59b, the guide roller attachment pins 39 and the leaf springs 69a and 69b are fixed to a base segment 74a. That is, in a molding step, a pair of two pins 39 for attaching a pair of two guide rollers 70, 71a, and 71b are positioned to be perpendicular to each other and embedded integrally with the leaf springs 69a and 69b in the deformation part 59b. The springs 69a and 69b are fixed to attachment segments 74b and 74c to be fitted in a recess between the positioning guides 47a and 47b, and the pins 47f are inserted in attachment holes 75a of the segments 74b and 74c to fix the deformation part 59b to the fixed part 59a. Note that the leaf springs 69a and 69b need not take a two-end-supported beam structure but may take a cantilever structure. Alternatively, instead of forming the springs 69a and 69b by a single plate, a pair of two parallel springs 69a and 69b may be used to allow the pins 39 to be displaced.

Figure 39:
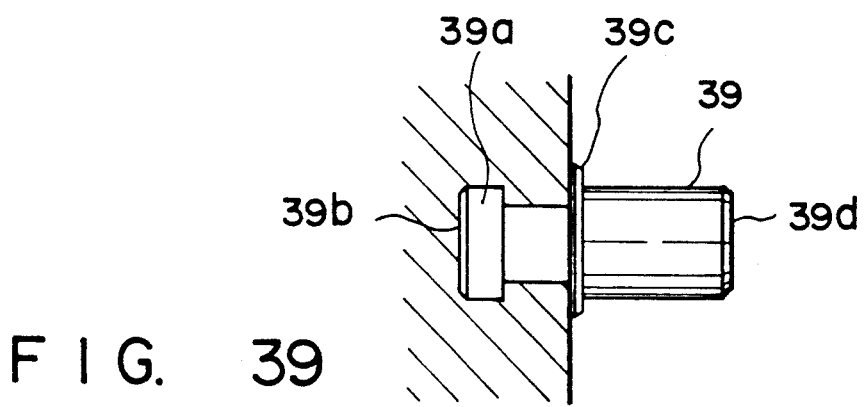
FIG. 39 is a sectional view showing a pin shown in FIG. 38

FIG. 39 shows a practical arrangement of the guide roller attachment pin 39. The pin 39 shown in FIG. 39 consists of a material different from the resin material of the side carriage sections 26b and 26c to which the pin is attached. A return portion 39a is formed at a portion to be embedded of the pin 39 so as to improve bite of a molding material upon molding, and positioning contact portions 39b and 39d are formed at upper and lower end portions thereof. A positioning flange portion 39c to be brought into contact with the guide rollers 70, 71a, and 71b is formed around the pin 39. The contact portion 39d fixes and supports the pin 39 by using a jig upon molding of a member to which the pin is attached. Note that the pin 39 shown in FIG. 39 is only an example and the present invention is not limited to this. For example, the pin 39 may be formed of the same material as that of a member to which the pin is attached. In this case, by forming a hole corresponding to the shape of the pin 39 in a metal mold for molding the pin attachment member, the projecting pin 39 can be molded integrally with the pin attachment member.

Figure 41A:
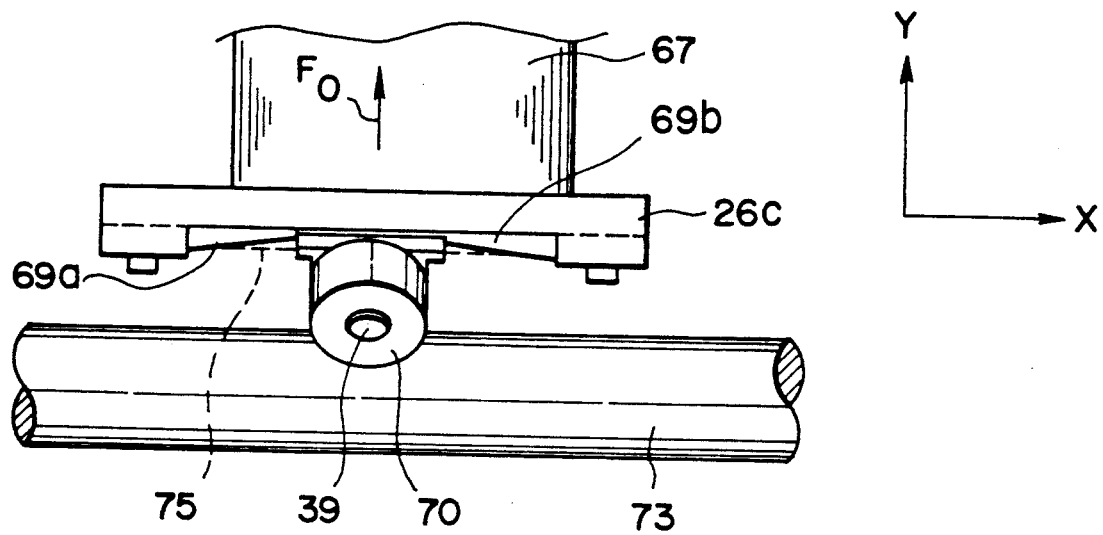
FIGS. 41A and 41B are enlarged plan views showing a structure for supporting the carriage shown in FIG. 20.
Figure 41B:
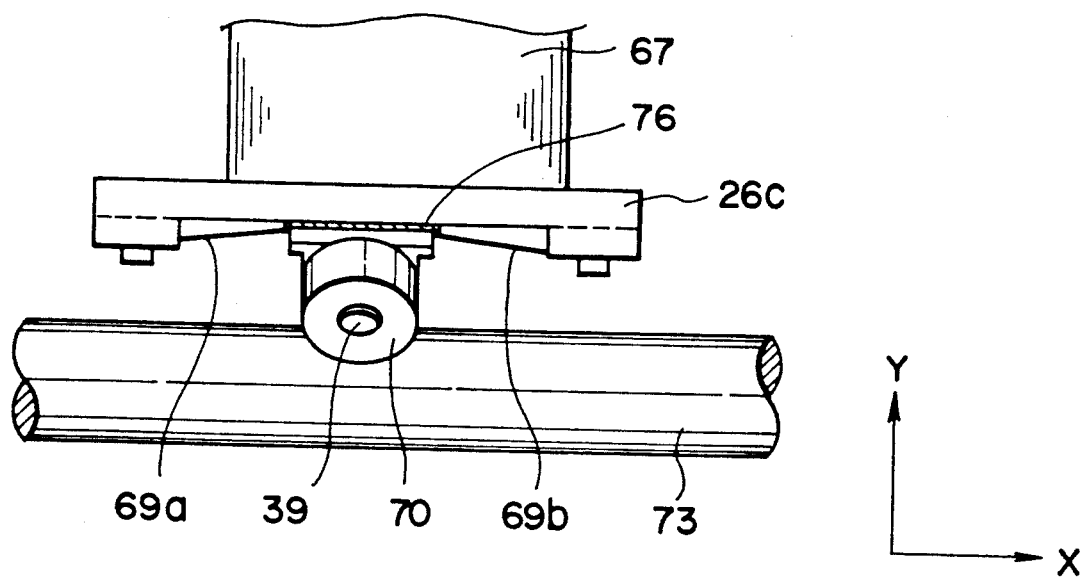

FIGS. 40, 41A and 41B show a planar positional relationship between the carriage 66 and linear guide 73a and 73b. In this arrangement, when the carriage 66 is driven in the X direction by an interaction between the magnetic circuits 41-1 and 41-2 and the coil 67, an advantage of elastic support of the guide rollers 70, 71a, and 71b by the leaf springs 69a and 69b is effectively achieved. This advantage will be described with reference to FIG. 41A. Note that a virtual line denoted by reference numeral 75 in FIG. 41A indicates an outline of the springs 69a and 69b which are elastically returned. Upon X-direction driving, the guide rollers 70, 71a, and 71b at the carriage section 26c side are urged against the linear guide 73b by an elastic force of the springs 69a and 69b. At this time, a force F0 applied from the linear guide 73b onto the guide rollers 70, 71a, and 71b is absorbed in the carriage 66 due to flexure of the springs 69a and 69b. Therefore, an unnecessary vibration of the carriage 66 caused by a specific play of each of the guide rollers 70, 71a, and 71b can be suppressed. When the two guide rollers are supported by the two-end-supported beam structure as shown in FIG. 40, the rotating shafts of the two guide rollers 70, 71a, and 71b are kept perpendicular to the linear guide direction even if the springs 69a and 69b flex. Therefore, a frictional resistance of the guide rollers 70, 71a, and 71b can be reduced when the linear motor carriage 66 is driven.

In addition, as shown in FIG. 41B, when a vibration damping material such as rubber or a gel material is interposed between the leaf springs 69a and 69b and the side carriage section 26c to add a vibration damping element in parallel with the springs 69a and 69b, a vibration caused by displacement produced between the springs 69a and 69b and the carriage section 26c can be reduced by a vibration damping member 76. That is, an unnecessary vibration produced upon driving of the carriage 66 can be reduced.

In the optical disk apparatus shown in FIG. 19, a light beam emitted from a light source located in the fixed optical system 74 fixed to the base 72 is transmitted through a guiding optical system including a shaping prism, a collimator lens, and the like located in a fixed optical system 94 similar to the light source, incident in the opening of the central carriage section 26a, and guided onto the surface of the disk 61 through the reflecting mirror 29 and the objective lens 62. The disk 61 is loaded via a spindle motor (not shown) mounted on the base 72. The light beam reflected and modulated by the surface of the disk 61 is transmitted through the objective lens 62 and the reflecting mirror 29 and guided to a detecting optical system located in a fixed optical system 76 and including a focusing lens, a photodetector, and the like. Therefore, the light beam is radiated onto the disk upon driving of the objective lens 62 in the Z and X directions to realize reproduction and recording of information with respect to the disk.

As described above, by fixing each member integrally with the integrally molded movable member, an optical head apparatus which is light in weight and causes no unnecessary vibration can be realized without complexity in manufacture/assembly. Especially when the present invention is applied to a separate type optical head as in this embodiment, positioning and inclination precision of the tracking coil 67 can be improved by the above structure. Therefore, no-contact insertion of the tracking coil 67 can be easily performed even when the magnetic gaps of the magnetic circuits 41-1 and 41-2 are formed to be comparatively narrow. In other words, response characteristics of X-direction driving of the carriage 66 can be improved. In addition, since the three carriage sections 26a, 26b, and 26c are connected by the tracking coil 67, a coil bobbin or another coil attachment section required by a conventional separate head apparatus need not be used. Furthermore, since the tracking coil 67 is used as a structural member, the optical head apparatus can be effectively made light in weight.

Figure 42:
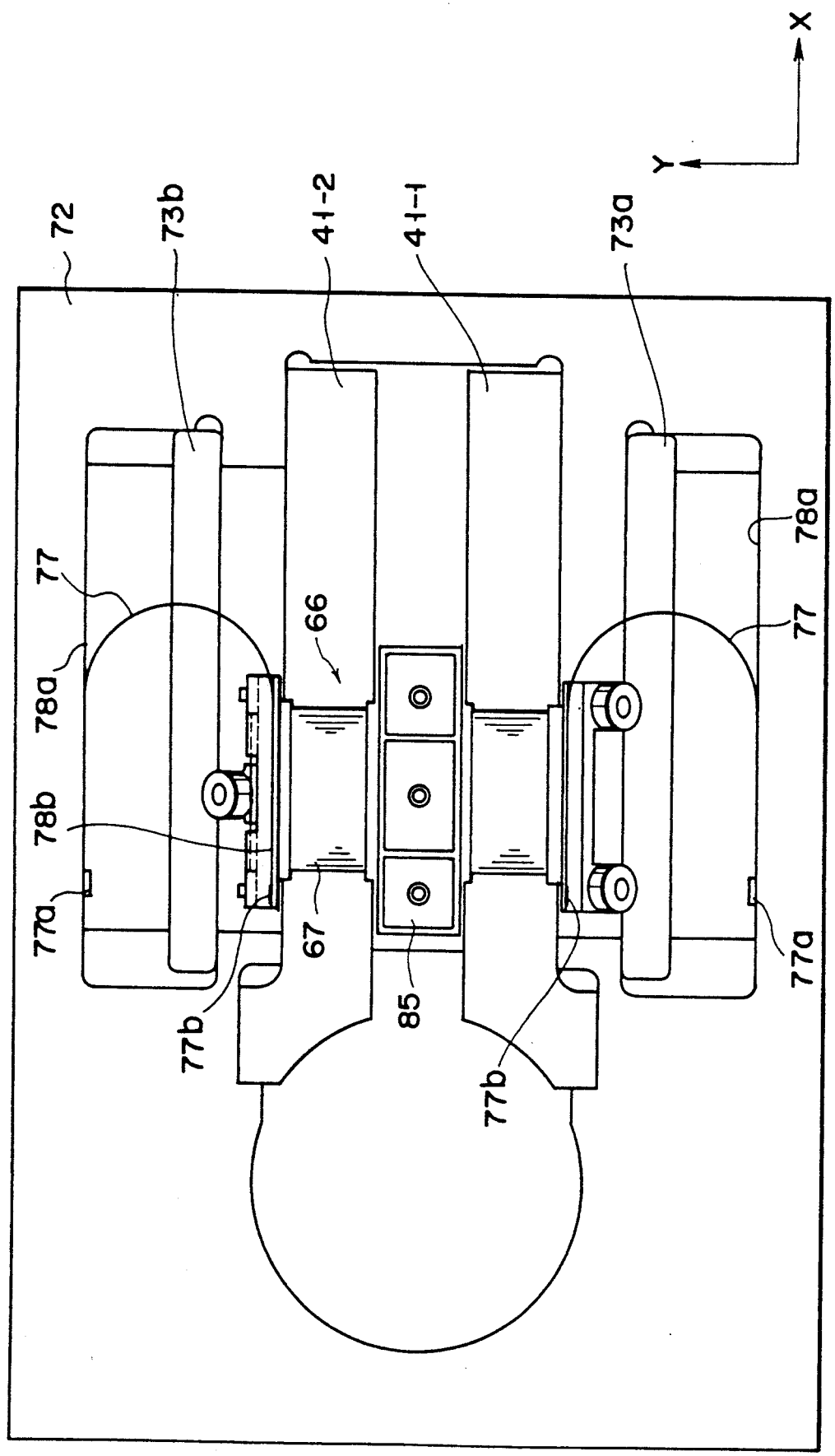
FIG. 42 is a plan view showing a rear structure of the optical disk apparatus shown in FIG. 18.

A wiring structure of the optical head apparatus according to the above embodiment will be described below. FIG. 42 shows a rear surface side of the optical head apparatus shown in FIG. 18. As shown in FIG. 42, a flexible print wire 77 for supplying power to the focusing coil 65 and the tracking coil 67 is arranged symmetrically about the X direction. That is, this print wire 77 is arranged with a predetermined curvature between a wire terminal 77a at the fixed side and a wire terminal 77b at the movable side. The fixed-side siring terminal 77a is fixed along surfaces 78a parallel to the direction of the linear guides formed on the base 72 and is connected to a power source (not shown). The movable-side wire terminal 77b is fixed along side surfaces 78b parallel to the surfaces 78a of the side carriage sections 26a and 26b.

In the above wiring structure, even when the carriage 66 is moved in the radial direction of the disk, since the curvature of the print wire 77 is maintained constant, no unnecessary counterforce is produced from the print wire 77 to the carriage 66. Therefore, the carriage 66 can be stably moved regardless of inner and outer portions of the disk.

FIG. 43 shows a connection structure between the print wire 77 and the tracking coil 67. A conductive lead wire 79 of the tracking coil 67 is formed inside the side carriage section 26c upon molding of the section 26c, and a portion 79a of the wire 79 is exposed at a lower portion of the carriage section 26c. The exposed portion 79a of the lead wire 79 is soldered to the movable-side flexible wire terminal 77b. In order to guide the lead wire 79 to the flexible wire 77, the number of turns of the tracking coil 67 is an even number. If, however, the number of is an odd number, the lead wire 79 is extended to the movable-side terminal 77b. The above arrangement of the lead wire 79 is similarly formed in the other side carriage section 26b.

FIG. 44 shows a connection structure for supplying a current to the focusing coil 65. The two movable-side terminals 77b connected to the fixed-side terminal 77a via the flexible wire 77 are also connected to exposed portions 74a of focus wires 74 at the carriage sections 26b and 26c. The focus wires 74 are plate- or rod-like conductive members embedded in the carriage sections 26a, 26b, and 26c constituting the carriage section upon molding of these sections and extended to the central carriage section 26a through behind the tracking coil 67. Exposed portions 74b of the wires 74 at the section 26a side are soldered to lead wires 76, and the other ends of the lead wires 76 are soldered to end portions 19b and 19c of the leaf spring 64a exposed at the focus actuator fixed section 17 side. Lead wires 78 of the focusing coil 65 are soldered to terminals 19e and 19f of the leaf spring 64b exposed at the lens holder 63 side. Since the leaf springs 64a and 64b are electrically connected via the parallel leaf springs 64 also serving as power supply members, they can be energized by supplying a current from the power source to the focusing coil 65.

Figure 45:
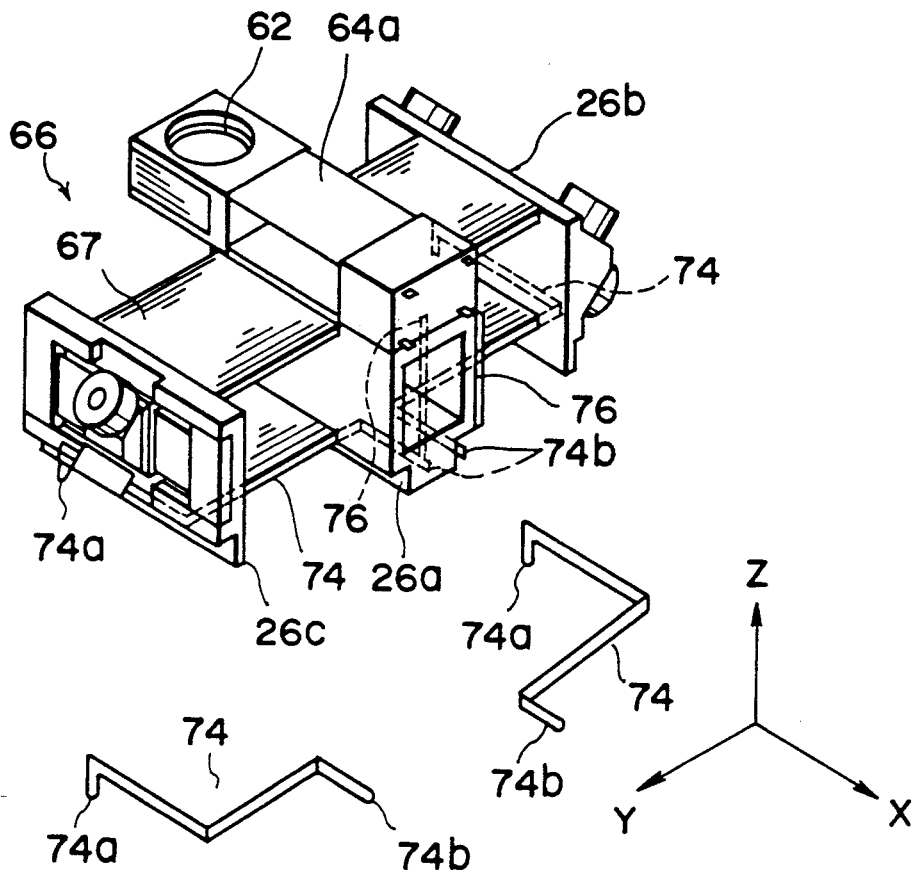
FIG. 45 is a view showing a shape of a plate-like wire member shown in FIG. 44A.

FIG. 45 shows a practical shape of the plate-like focus wires 74 separated from the carriage 66. Referring to FIG. 45, the exposed portions 74a at the side carriage sections 26b and 26c side are positioned in an opposite direction to that shown in FIG. 44. However, the exposed position can be arbitrarily selected, and the positions or the like of the lead wire 79 or the movable-side terminals 77b can be arbitrarily changed in accordance with the exposed position. As shown in FIGS. 42 to 45, by molding a lead wire 79 or the focus wire 84 integrally with the carriage 66, complexity in the shape of the flexible wire can be eliminated.

Other embodiments of the present invention will be described below with reference to FIGS. 46 and 47.

Figure 46:
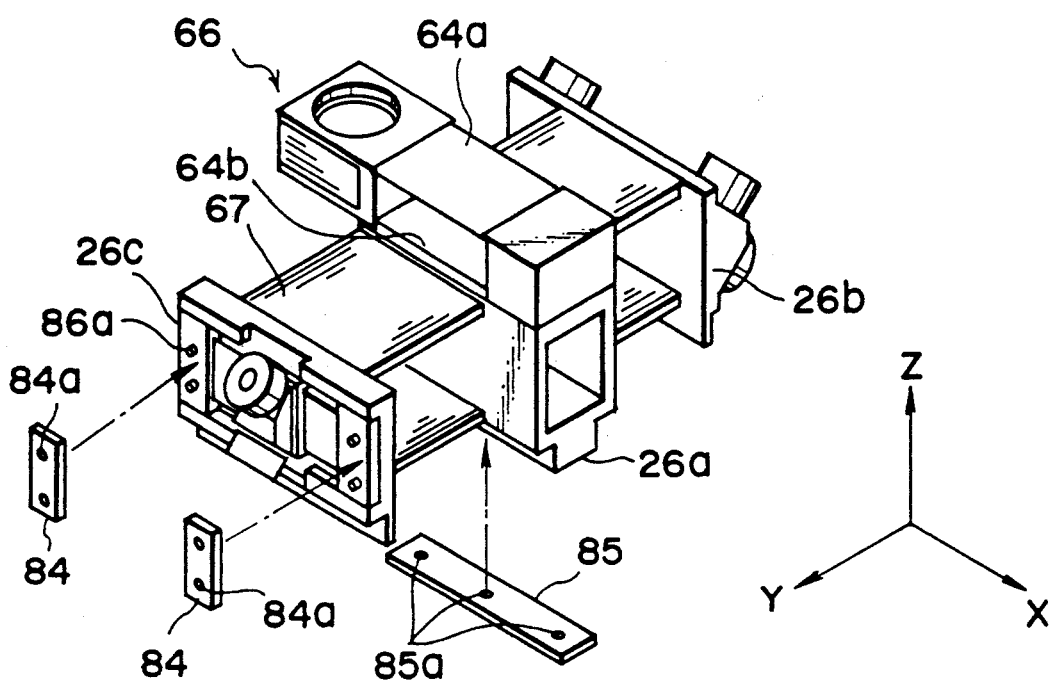
FIG. 46 is a perspective view showing the carriage shown in FIG. 20 and balance weights attached thereto.

In the embodiment shown in FIG. 46, balance weights are attached to a carriage 66. In order to drive the carriage 66 in the radial direction of a disk, a driving force must be applied on the center of gravity of the carriage so as not to produce an unnecessary vibration. In the embodiment shown in FIG. 46, therefore, balance weights 84 and 85 are attached to the carriage 66. These balance weights 84 and 85 are arranged at upper and lower portions or right and left portions of the carriage. A shown in FIG. 46, by fitting attachment holes 84a on attachment pins 86a of carriage sections 26b and 26c, the balance weights are fixed by adhesion to the carriage sections 26b and 26c of the carriage 66. Alternatively, the balance weights are fixed integrally with the carriage sections 26b and 26c upon molding of the resin portions of the carriage 66.

Figure 47:
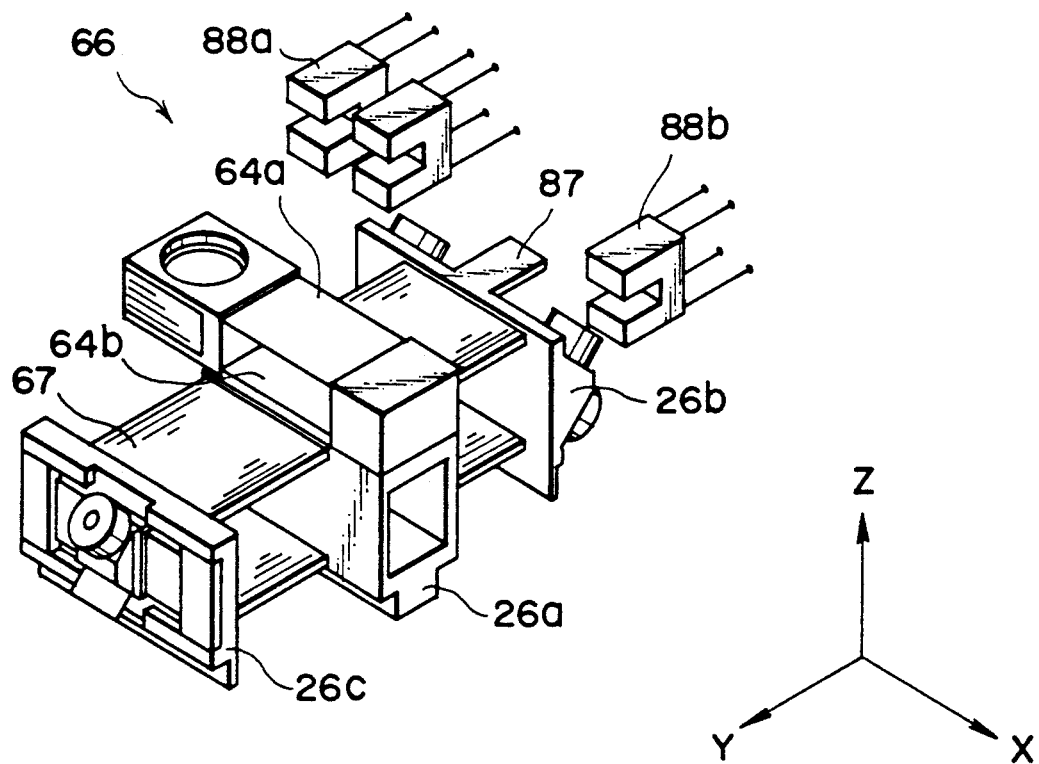
FIG. 47 is a perspective view showing the carriage shown in FIG. 20 and a detection portion for detecting a position of the carriage.

In the embodiment shown in FIG. 47, a carriage 66 includes a portion 87 to be detected for detecting the position of the carriage 66 moved in the radial direction of a disk. The portion 87 is fixed integrally with a carriage section 26b of the carriage 66 or fixed by adhesion to the carriage section 26b. When a position detecting unit 88 arranged in the fixed part detects the portion 87 to be detected, a position of the carriage 66 in the disk radial direction is detected.

FIG. 48 shows a modification of the system of supporting the guide rollers 70, 71a, and 71b at the carriage section 26c side. In this modification, the leaf springs 69a and 69b are omitted, and the base segment 74a and the guide roller attachment pins 39 are formed integrally with the section 26c. In this case, although the guide rollers 70, 71a, and 71b are not elastically supported by the leaf springs 69a and 69b, a play in each of the guide rollers 70, 71a, and 71b can be removed by additionally providing a structure for supporting the linear guide 73b in the Y direction to allow a small dislocation of the guide 73b.

Figure 50:
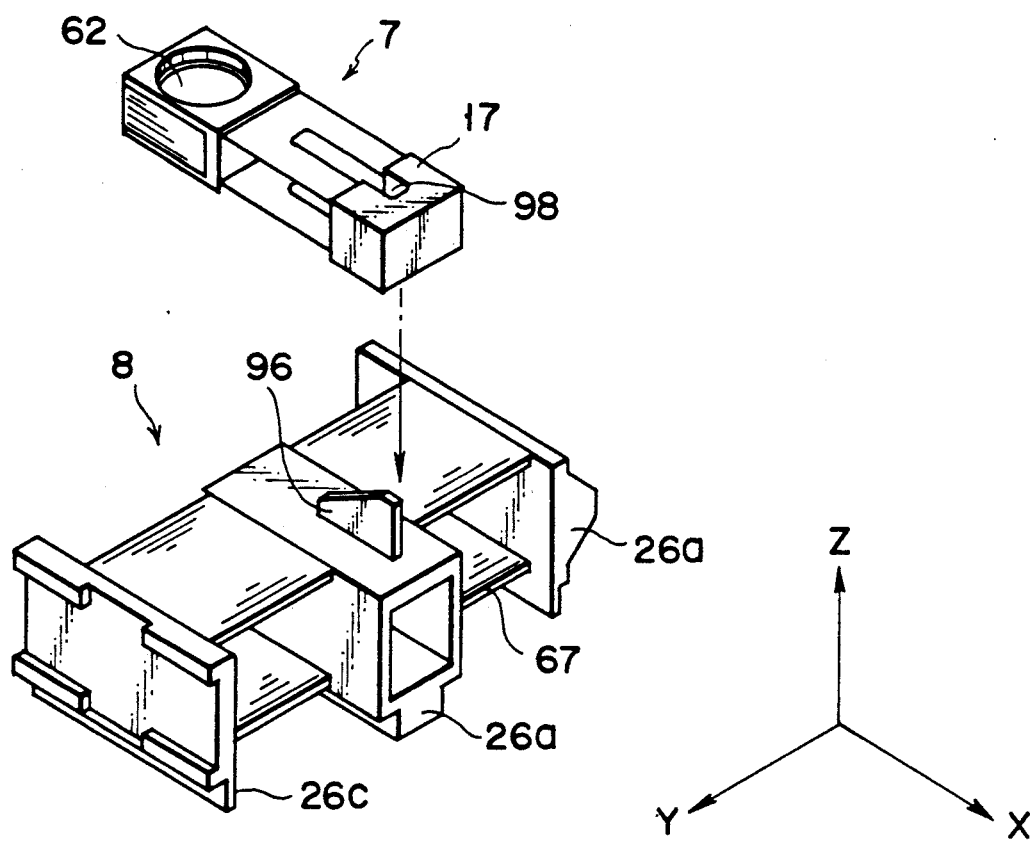

FIGS. 49 and 50 show a modification of the attachment structure between the focus actuator 65 and the carriage 66. As shown in FIG. 49, the upper surface of the carriage section 26a and the lower surface of the focus actuator fixing section 17 are formed to have a recess 90 and a projection 92, respectively. The recess 90 and the projection 92 are engaged with each other to improve the connection strength. The gap, i.e., the adhesive layer is formed in the connecting portion between the focus actuator 65 and the carriage section 26a. Therefore since the bonding force of the adhesive layer is unsatisfactory with respect to X-direction driving of the carriage 66, the position of the focus actuator 65 may be deviated relative to the carriage section 26a. In order to prevent this positional deviation, as shown in FIG. 50, a through hole 98 is formed in the focus actuator 65, and a reinforcing member 96 is projected at the height of the center of gravity in the Z direction of the focus actuator 65 from the carriage section 26a side and fixed to the focus actuator fixing section 17. Since the connecting surface between the reinforcing member 96 and the actuator fixing section 17 is set in the Z direction, i.e., a direction perpendicular to the X direction as the radial direction, no positional deviation is produced between the upper and lower structures 7 and 8 when the carriage 66 is transported, thereby improving tracking properties of the objective lens 6 with respect to X-direction driving of the carriage 66.

Figure 51:
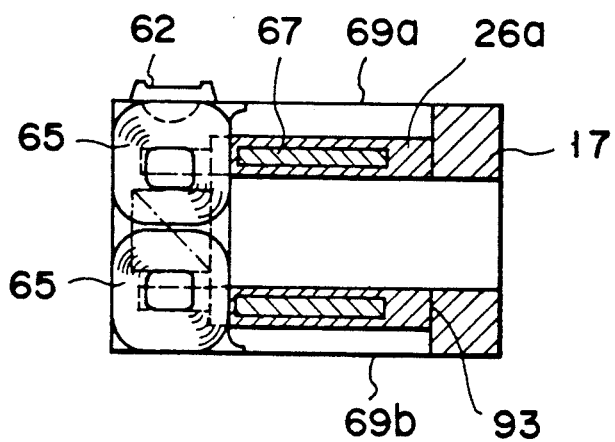

FIG. 51 shows a connecting portion between the focus actuator 65 and the central carriage section 26a of the carriage 66 according to a modification of the carriage structure. In this structure, the two members including an adjustment margin are bonded by an adhesion portion 93.

FIG. 52 is an exploded view showing the focus actuator 65, the carriage 66, and their additional members shown in FIGS. 18 to 20, 13, and 35. A detailed arrangement of each additional member is as described above. The balance weight 84 is molded integrally with a resin, and a position detecting slit 87 is positionally adjusted and adhered to the carriage 66.

In order to apply the present invention to a standard optical head apparatus such as a conventional optical head apparatus 100, a chassis 103 of the standard optical head apparatus 100 is molded, and a tracking coil 108, guide roller support pins, and the like are molded integrally with the chassis 103. Thereafter, optical parts such as an optical pickup 104, a semiconductor laser, a collimator lens, and a photodetector, or an optical head in which these parts are integrated are or is connected to the chassis 102, thereby constituting an optical head actuator. In this case, a problem of a heavy weight of a conventional apparatus is solved, and a compact and light standard optical head which can move at a high speed and has an improved assembly precision is obtained.

In each of the above embodiments, a resin material is used as a molding material. However, the same effects as in the above embodiments can be obtained by using a ceramic, an aluminum alloy, a magnesium alloy, or the like instead of the resin material. Note that insulation with respect to the wiring system must be considered when an alloy material is used.

Although an optical disk apparatus is taken as a example of an optical recording/reproduction apparatus in each of the above embodiments, the present invention is not limited to these embodiments. In addition, an optical recording/reproduction apparatus using an opto-magnetic disk, an optical card, an opto-magnetic card, or the like as an optical recording medium may be used. Furthermore, the present invention can be applied not only to a linear type apparatus as in the above embodiments but also to a rotary type apparatus.

As has been described above, according to the present invention, there are provided an electro-magnetic actuator which can constantly provide a stable driving force and can be made compact in size and an optical disk apparatus which can reliably perform positioning control.

According to an optical head of the present invention, a movable member is integrally molded by using a resin material (or a material such as a ceramic, an aluminum alloy, or a magnesium alloy) which is comparatively light in weight. Therefore, an optical head which has improved vibration characteristics, is compact in size and light in weight, has high productivity, and can move at a high speed can be provided. Therefore, problems of both of conventional separate type and standard optical heads can be solved.

Since the optical head actuator has the structure wherein the separated sections are coupled, the movable members and molding metal molds can be easily manufactured. In addition, since an adhesive is flowed and hardened in a gap of a connecting portion between the upper and lower movable members (structures), an inclination of an objective lens can be easily adjusted. This adhesion scheme using a gap and an adhesive is also effective in inclination adjustment for a reflecting mirror. By using a means for engaging not only the connecting portion of the upper and lower movable members but also connecting portions of other members, these members can be easily and tightly connected. As a result, the productivity can be further improved.

When guide roller support pins at one side surface are arranged to be supported via elastic support members, an unnecessary rotational vibration caused by a play in each guide roller rolling on a fixed guide shaft can be suppressed. If vibration damping elements are additionally provided in parallel with the elastic support members, an unnecessary vibration can be further effectively suppressed.

Since the guide roller support pins of this type can be molded together with the movable member by using the same type of material as the molding material, pins having improved inclination or positional precision can be obtained. Even when the pins are formed by using a material different from the molding material, the inclination or positional precision of the pins or an attachment precision of the guide rollers can be further improved by forming a return portion, contact portions, a flange, and the like.

Since a flexible wire which can track driving of the movable member is used as a wire, arranged between a current supply side and a movable member side, for supplying power to a coil, difficulty of supplying a current to a moving movable member is eliminated.

A lead wire of a tracking coil is exposed at the movable member side of the print wire through inside the resin material of the movable member, and the shape of the lead wire is improved. As a result, the print wire and the tracking coil can be easily electrically connected. In addition, since a wire member for a focusing coil (or another lens driving means) is embedded beforehand in a carriage section of the movable portion, the focusing coil can be easily electrically connected to the print wire.

In a standard optical head, a wire for supplying power to an optical head can be guided to a movable portion by the same method.

The optical head apparatus according to the present invention can include members as used in a conventional optical head such as an objective lens attachment portion, a portion to be detected for detecting a position of the movable member, and balance weights. In this case, these members can be molded integrally with the movable member to reduce the number of attachment operations.

Additional advantages and modifications will readily occur to those skilled in the art. Therefore, the invention in its broader aspects is not limited to the specific details shown and described. Accordingly, various modifications may be made without departing from the spirit or scope of the general inventive concept as defined by the appended claims and their equivalents.

What is claimed is:

1. An apparatus for generating a driving force, comprising:
   a first yoke, having a flat surface, for allowing magnetic fluxes to pass therethrough;
   a second yoke, having one and opposite flat surfaces, said one surface opposing one surface of said first yoke via a first gap, and arranged in a first direction, for allowing magnetic fluxes to pass therethrough;
   a third yoke, having one flat surface opposing the opposite surface of said second yoke via a second gap, and arranged in the first direction, for allowing magnetic fluxes to pass therethrough;
   first and second plate-like permanent magnets each having surfaces of one and another poles, separately arranged in said first gap in a second direction perpendicular to the first direction, the surface of the one pole being fixed to the surface of said first yoke, and the surface of another pole being fixed to said second yoke;
   third and fourth plate-like permanent magnets each having surfaces of one and another poles, separately arranged in said second gap in the second direction, the surface of the another pole being fixed to said opposite surface of said second yoke, and the surface of the one pole being fixed to said one surface of said third yoke, said first, second, third and fourth plate-like permanent magnets supplying magnetic fluxes to said yokes to generate first and second magnetic fields across said first and second gaps, respectively, in the first direction;
   a first electro-magnetic coil extending in said first and second gaps, first and second current components being supplied to the first electro-magnetic coil in one and opposite directions in said first and second gaps, respectively, along a third direction that is perpendicular to the first and second directions;
   supporting means for supporting said first electro-magnetic coil to move in the second direction, said first electro-magnetic coil being moved in the second direction by a first driving force generated by interactions between the first magnetic field and the first current component and between the second magnetic field and the second current component;
   magnetic field generating means, arranged close to one of said first and second yokes, for generating a third magnetic field in the third direction; and
   a second electro-magnetic coil held on said supporting means to move in the first direction and having a section in which a third current component is flowed in the second direction, said second electromagnetic coil being moved in the first direction by a second driving force generated by an interaction between the third magnetic field and the third current, wherein said magnetic field generating means includes a fifth permanent magnet having one and another poles arranged in the third direction and wherein said fifth permanent magnet is fixed to one of said first and second yokes.

2. An apparatus according to claim 1, wherein one of said first and second yokes has a recess for receiving said fifth permanent magnet.

3. An apparatus according to claim 1, wherein each of said first and second gaps has a predetermined gap length in the first direction.

4. An apparatus according to claim 1, wherein each of said first and second gaps has a predetermined gap width in the third direction.

5. An apparatus according to claim 1, wherein each of said first and second gaps is defined as a substantially rectangular space.

6. An apparatus for generating a driving force, comprising:
   a first yoke, having a flat surface, for allowing magnetic fluxes to pass therethrough;
   a second yoke, having one and opposite flat surfaces, said one surface opposing one surface of said first yoke via a first gap, and arranged in a first direction, for allowing magnetic fluxes to pass therethrough;
   a third yoke, having one flat surface opposing the opposite surface of said second yoke via a second gap, and arranged in the first direction, for allowing magnetic fluxes to pass therethrough;
   first and second plate-like permanent magnets each having surfaces of one and another poles, separately arranged in said first gap in a second direction perpendicular to the first direction, the surface of the one pole being fixed to the surface of said first yoke, and the surface of another pole being fixed to said second yoke;
   third and fourth plate-like permanent magnets each having surfaces of one and another poles, separately arranged in said second gap in the second direction, the surface of the another pole being fixed to said opposite surface of said second yoke, and the surface of the one pole being fixed to said one surface of said third yoke, said first, second, third and fourth plate-like permanent magnets supplying magnetic fluxes to said yokes to generate first and second magnetic fields across said first and second gaps, respectively, in the first direction;
   a first electro-magnetic coil extending in said first and second gaps, first and second current components being supplied to the first electro-magnetic coil in one and opposite directions is said first and second gaps, respectively, in a third direction perpendicular to the first and second directions;
   supporting means for supporting said first electro-magnetic coil to move in the second direction, said first electro-magnetic coil being moved in the second direction by a first driving force generated by interactions between the first magnetic field and the first current component and between the second magnetic field and the second current component;
   magnetic field generating means, arranged close to one of said first and second yokes, for generating a third magnetic field in the third direction; and a second electro-magnetic coil held on said supporting means to move in the first direction and having a section in which a third current component is flowed in the second direction, said second electro-magnetic coil being moved in the first direction by a second driving force generated by an interaction between the third magnetic fields and the third current, wherein said magnetic field generating means includes a fifth permanent magnet having one and another poles arranged in the third direction and wherein one of said first and second yokes has a recess for receiving said fifth permanent magnet.

7. A system for optically reproducing information from an optical recording medium, comprising:

focusing means for focusing a light beam onto said optical recording medium in a first direction;

moving means for moving said focusing means in the first direction;

driving force generating means for generating a first driving force to convey said focusing means in a second direction perpendicular to the first direction, said driving force generating means including first and second magnetic circuit means arranged with an interval therebetween in a third direction perpendicular to the first and second direction, and conveyor means for conveying said focusing means in the second direction;

each of said first and second magnetic circuit means including;

a first yoke, having a flat surface, for allowing magnetic fluxes to pass therethrough;

a second yoke, having one and opposite flat surfaces, said one surface opposing one surface of said first yoke via a first gap, and arranged in a first direction, for allowing magnetic fluxes to pass therethrough;

a third yoke, having one flat surface opposing the opposite surface of said second yoke via a second gap and arranged in the first direction, for allowing magnetic fluxes to pass therethrough;

first and second plate-like permanent magnets each having surfaces of one and another poles, separately arranged in said first gap in a second direction perpendicular to the first direction, the surface of the one pole being fixed to the surface of said first yoke, and the surface of another pole being fixed to said second yoke;

third and fourth plate-like permanent magnets each having surfaces of one and another poles, separately arranged in said second gap in the second direction, the surface of the another pole being fixed to said opposite surface of said second yoke, and the surface of the one pole being fixed to said one surface of said third yoke, said first, second, third and fourth plate-like permanent magnets supplying magnetic fluxes to said yokes to generate first and second magnetic fields across said first and second gaps in the first direction, respectively; and magnetic field generating means, arranged close to one of said first and second yokes, for generating a third magnetic field in the third direction;

said conveyor means including:

an electro-magnetic tracking coil having first and second sections extending in said first and second magnetic circuits, said first and second sections extending in said first and second gaps of each of said first and second magnetic circuits, respectively, and first and second current components being supplied to the first and second sections in one and opposite directions in said first and second gaps in the third direction, respectively, and first supporting means for supporting said electro-magnetic tracking coil to be conveyed in the second direction, said electro-magnetic coil being conveyed in the second direction by a first driving force generated by interactions between the first magnetic field and the first current component and between the second magnetic field and the second current component, and said moving means including;

an electro-magnetic focusing coil having a section in which a third current component is flowed in the second direction, and second supporting means, held on said first supporting means, for supporting said electro-magnetic focusing coil and said focusing means to move in the first direction, said focusing means and said electro-magnetic focusing coil being moved in the first direction by a second driving force generated by interaction between the third magnetic fields and the third current; and optical guide means for guiding light beams to said focusing means being conveyed, wherein said magnetic field generating means includes a fifth permanent magnet having one and another poles arranged in the third direction and wherein said fifth permanent magnet is fixed to one of said first and second yokes.

8. A system according to claim 7, wherein one of said first and second yokes has a recess for receiving said fifth permanent magnet.

9. A system according to claim 7, wherein said first supporting means includes movable means on which said electro-magnetic tracking coil is fixed, and mechanical guide means for guiding said movable means to be mechanically conveyed.

10. A system according to claim 9, wherein said mechanical guide means includes first and second guide roller mechanisms fixed to said electro-magnetic tracking coil, and first and second guide rails, extending parallel to each other in the second direction, for guiding said first and second guide roller mechanisms, respectively.

11. A system according to claim 10, wherein said movable means includes suspending means for suspending one of said first and second guide roller mechanisms to be deformed in the third direction.

12. A system according to claim 9, wherein said movable means has a path for passing a light beam.

13. A system according to claim 12, wherein said optical guide means includes reflecting means, fixed in said movable means, for reflecting a light beam toward said focusing means.

14. A system according to claim 9, wherein said second supporting means includes a pair of leaf springs arranged parallel to each other on said movable means and having one end portion fixed to said movable means and the other end portion fixed to said electro-magnetic focusing coil and said focusing means.

15. An optical head assembly for scanning an optical recording medium with a light beam, comprising:

focusing means, having an optical axis, for focusing a light beam onto a surface of said optical recording medium;

first electro-magnetic coil means for generating a driving force for moving said focusing means in a first direction along the optical axis;

supporting means, having one and the other end portion, for suspending said focusing means and said first electro-magnetic coil means to move in the first direction;

a first structure including a first resin portion to which said electro-magnetic coil means and one end portion of said supporting means are fixed and a second resin portion to which the other end portion of said supporting means is fixed, said first and second resin portions each being integrally molded; and a second structure having a third resin portion to which a second electro-magnetic coil means is fixed, said third resin portion being integrally molded, said first structure being fixed to said second structure, and said first and second structures being capable of moving in a second direction, wherein said second electro-magnetic coil means includes a coil structure having one and the other end portions extending in a third direction perpendicular to the first and second directions, wherein said second structure includes fourth and fifth resin portions fixed to one and the other end portions of said coil structure, respectively, said fourth and fifth resin portions each being integrally molded, wherein said second structure further includes suspending means, fixed to said fourth resin portion, for suspending a first guide roller mechanism to be deformed in the third direction, and wherein said second structure further includes a sixth resin portion to be moved in the third direction upon deformation of said suspending means, said suspending means and said first guide roller mechanism being fixed to said sixth resin portion.

16. An assembly according to claim 15, wherein said sixth resin portion is mounted above said fourth resin portion with a small gap therebetween.

17. An assembly according to claim 15, further comprising a member, interposed in a small gap, for damping a vibration of said sixth resin portion.

18. An assembly according to claim 15, wherein said suspending means includes a pair of deformable leaf springs fixed to said sixth resin portion.

19. An assembly according to claim 15, wherein said first structure has a recess, and said second structure has a projection projecting in the first direction and fitted in said recess of said first structure.

20. An apparatus for reproducing information from an optical recording medium, comprising:

an optical head assembly for scanning said optical recording medium with a light beam, said assembly including:

focusing means, having an optical axis, for focusing a light beam onto a surface of said optical recording medium;

first electro-magnetic coil means for generating a driving force for moving said focusing means in a first direction along the optical axis;

supporting means, having one and the other end portion, for suspending said focusing means and said first electro-magnetic coil means to move in the first direction;

a first structure including a first resin portion to which said focusing means, said electro-magnetic coil means and one end portion of said supporting means are fixed and a second resin portion to which the other end portion of said supporting means is fixed, said first and second resin portion each being integrally molded; and a second structure having a third resin portion to which a second electro-magnetic coil means is fixed, said third resin portion being integrally molded, said first structure being fixed to said second structure, and said first and second structures being capable of moving in a second direction; and first and second guide roller mechanism, fixed to said second structure, for conveying said second structure;

first and second guide rails, extending parallel to each other in the second direction, for guiding said first and second guide roller mechanisms, respectively;

means for generating a magnetic field for causing said first electro-magnetic coil to generate a driving force; and means for generating a magnetic field for causing said second electro-magnetic coil to generate a driving force, wherein said second electro-magnetic coil means includes a coil structure having one and the other end portions extending in a third direction perpendicular to the first and second direction, wherein said second structure includes fourth and fifth resin portions fixed to one and the other end portions of said coil structure, respectively, said fourth and fifth resin portions each being integrally molded, wherein said second structure further includes suspending mean, fixed to said fourth resin portion, for suspending said first guide roller mechanism to be deformed in the third direction, and wherein said second structure includes a sixth resin portion to be moved in the third direction upon deformation of said suspending means, said suspending means and said first guide roller mechanism being fixed to said sixth resin portion.

21. An apparatus according claim 20, wherein said sixth resin portion is mounted above said fourth resin portion with a small gap therebetween.

22. An apparatus according to claim 21, further comprising a member, interposed in said small gap, for damping a vibration of said sixth resin portion.

23. An apparatus according to claim 20, wherein said suspending means includes a pair of deformable leaf springs fixed to said sixth resin portion.

24. An apparatus according to claim 20, wherein said first structure has a recess, and said second structure has a projection projecting in the first direction and fitted in said recess of said first structure.

25. An apparatus according to claim 20, further comprising flexibly deformable current supply means, having one end connected to said second structure, for supplying a current to said first and second electro-magnetic coils.

26. An apparatus according to claim 25, wherein said current supply means includes a pair of flexible print wires for cancelling a bias force in the third direction.

27. An apparatus according to claim 25, wherein said supporting means includes a pair of conductive leaf springs electrically connected to said current supply means.

28. An apparatus according to claim 20, further comprising means for detecting movement of said optical head assembly.

29. An apparatus according to claim 25, wherein said current supplying means includes a pair of lead frames, molded in the second structure, for supplying a current to said first and second electro-magnetic coils.

30. An apparatus according to claim 20, further comprising counter weights fixed to the second structure.

31. An apparatus according to claim 20, wherein said second structure includes pins for rotatably supporting guide roller mechanisms.

* * * * *

UNITED STATES PATENT AND TRADEMARK OFFICE
CERTIFICATE OF CORRECTION

PATENT NO. : 5,317,552
DATED : May 31, 1994
INVENTOR(S) : Hideo YAMASAKI

It is certified that error appears in the above-indentified patent and that said Letters Patent is hereby corrected as shown below:

On the title page, Item [30], the 3rd Foreign Application Priority number should read as follows:

--2-44403--

Signed and Sealed this

Sixth Day of September, 1994

Attest:

BRUCE LEHMAN

*Attesting Officer*  *Commissioner of Patents and Trademarks*